US012016051B2

United States Patent
Ozturk et al.

(10) Patent No.: US 12,016,051 B2
(45) Date of Patent: Jun. 18, 2024

(54) TECHNIQUES FOR CONFIGURING RANDOM ACCESS TRANSMISSIONS

(71) Applicant: QUALCOMM Incorporated, San Diego, CA (US)

(72) Inventors: Ozcan Ozturk, San Diego, CA (US); Xiaoxia Zhang, San Diego, CA (US); Tao Luo, San Diego, CA (US); Muhammad Nazmul Islam, Littleton, MA (US); Jing Sun, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/752,484

(22) Filed: Jan. 24, 2020

(65) Prior Publication Data

US 2020/0252967 A1 Aug. 6, 2020

Related U.S. Application Data

(60) Provisional application No. 62/801,545, filed on Feb. 5, 2019.

(51) Int. Cl.
*H04W 74/08* (2024.01)
*H04B 17/318* (2015.01)
(Continued)

(52) U.S. Cl.
CPC ...... *H04W 74/0808* (2013.01); *H04B 17/318* (2015.01); *H04B 17/336* (2015.01);
(Continued)

(58) Field of Classification Search
None
See application file for complete search history.

(56) References Cited

U.S. PATENT DOCUMENTS

2007/0149206 A1* 6/2007 Wang ............... H04W 36/0077
455/450
2017/0094571 A1* 3/2017 Yu ......................... H04W 36/08
(Continued)

FOREIGN PATENT DOCUMENTS

EP 3917266 A1 12/2021
TW 201822570 A 6/2018
(Continued)

OTHER PUBLICATIONS

Motorola Mobility: "Physical Channel Design for 2-step RACH", 3GPP Draft; R1-1800727 Physical Channel Design for 2-step RACH V0, 3rd Generation Partnership Project (3GPP), Mobile Competence Centre ; 650, Route Des Lucioles; F-06921 Sophia-Antipolis Cedex; France, vol. RAN WG1, No. Vancouver, Canada; Jan. 22, 2018-Jan. 26, 2018 Jan. 13, 2018, XP051385042, Retrieved from the Internet: URL:http://www.3gpp.org/ftp/tsg%5Fran/WG1%5FRL1/TSGR1%5FAH/NR%5FAH%5F1801/Docs/ [retrieved on Jan. 13, 2018], 4 pages.
(Continued)

*Primary Examiner* — Scott M Sciacca
(74) *Attorney, Agent, or Firm* — QUALCOMM Incorporated

(57) ABSTRACT

Methods, systems, and devices for wireless communications are described. Examples may include receiving, at a user equipment (UE) a random access channel (RACH) configuration message from a base station, where the message indicates a channel metric (e.g., received signal strength indicator (RSSI), reference signal received power (RSRP), reference signal received quality (RSRQ), a signal-to-noise ratio (SNR), signal-to-interference-plus-noise ratio (SINR), or the like) and a threshold associated with the channel metric. The, UE may measure a reference signal (e.g., synchronization signal block (SSB), channel state information reference signal (CSI-RS), or the like) and select a
(Continued)

RACH procedure based on comparing the measured channel metric to the threshold. For example, the UE may select a two-step RACH procedure if the measured channel metric satisfies the threshold specified in the configuration. In some cases, the UE may select a RACH procedure or a listen-before-talk (LBT) procedure based on a QoS parameter.

26 Claims, 21 Drawing Sheets

(51) Int. Cl.
| | | |
|---|---|---|
| *H04B 17/336* | (2015.01) | |
| *H04L 1/00* | (2006.01) | |
| *H04L 5/00* | (2006.01) | |
| *H04W 24/10* | (2009.01) | |
| *H04W 56/00* | (2009.01) | |
| *H04W 68/00* | (2009.01) | |
| *H04W 74/0808* | (2024.01) | |
| *H04W 76/27* | (2018.01) | |
| *H04W 80/02* | (2009.01) | |

(52) U.S. Cl.
 CPC .......... *H04L 1/0026* (2013.01); *H04L 5/0051* (2013.01); *H04W 24/10* (2013.01); *H04W 56/001* (2013.01); *H04W 56/0045* (2013.01); *H04W 68/005* (2013.01); *H04W 76/27* (2018.02); *H04W 80/02* (2013.01)

(56) References Cited

U.S. PATENT DOCUMENTS

| | | | |
|---|---|---|---|
| 2017/0251499 A1 | 8/2017 | Radulescu et al. | |
| 2018/0110074 A1 | 4/2018 | Akkarakaran et al. | |
| 2018/0110075 A1 | 4/2018 | Ly et al. | |
| 2018/0279186 A1* | 9/2018 | Park | H04W 36/30 |
| 2019/0132882 A1* | 5/2019 | Li | H04L 27/2605 |
| 2020/0045742 A1* | 2/2020 | Suzuki | H04W 74/0833 |
| 2020/0107369 A1* | 4/2020 | Jeon | H04W 74/0833 |
| 2020/0146069 A1* | 5/2020 | Chen | H04W 52/362 |
| 2020/0374925 A1* | 11/2020 | Su | H04B 1/7143 |
| 2021/0168862 A1* | 6/2021 | Murray | H04W 74/002 |
| 2021/0219349 A1* | 7/2021 | Huang | H04W 74/0833 |
| 2021/0352713 A1* | 11/2021 | Wu | H04L 5/00 |
| 2022/0078718 A1* | 3/2022 | Hoshino | H04W 72/02 |

FOREIGN PATENT DOCUMENTS

| | | |
|---|---|---|
| WO | WO-2017147550 A1 | 8/2017 |
| WO | WO-2018064367 A1 | 4/2018 |
| WO | WO-2018175809 A1 | 9/2018 |
| WO | WO-2020088652 A1 | 5/2020 |

OTHER PUBLICATIONS

Partial International Search Report—PCT/US2020/015266—ISA/EPO—Apr. 7, 2020.
Interdigital: "2-Step RACH Procedure," 3GPP Draft, 3GPP TSG-RAN WG2 Meeting# 103bis, R2-1814008 (R15 NRU SI AI 11211 2-STEP RACH), 3rd Generation Partnership Project (3GPP), Mobile Competence Centre, 650, Route Des Lucioles, F-06921, Sophia-Antipolis Cedex, France, vol. RAN WG2, No. Chengdu, China; Oct. 8, 2018-Oct. 12, 2018, Sep. 27, 2018), XP051523471, 5 pages, Retrieved from the Internet:URL:http://www.3gpp.org/ftp/tsg%5Fran/WG2%5FRL2/TSGR2%5F103bis/Docs/R2%2D1814008%2Ezip [retrieved on Sep. 27, 2018] p. 1, lines 19-26, p. 2, lines 16-21.
International Search Report and Written Opinion—PCT/US2020/015266—ISA/EPO—Jun. 8, 2020.
Mediatek Inc., " LBT and CAPC for Random Access in NR-U," , 3GPP Draft, 3GPP TSG-RAN2#103-BIS meeting, R2-1813680 LBT and CAPC for RACH in NR-U, 3rd Generation Partnership Project (3GPP), Mobile Competence Centre, 650, Route Des Lucioles, F-06921, Sophia-Antipolis Cedex, France, vol. RAN WG2, No. Chengdu, China; Oct. 8, 2018-Oct. 13, 2018, Sep. 27, 2018 (Sep. 27, 2018), XP051523175, 4 pages, Retrieved from the Internet: URL:http://www.3gpp.org/ftp/tsg%5Fran/WG2%5FRL2/TSGR2%5F103bis/Docs/R2%2D1813680%2Ezip [retrieved on Sep. 27, 2018]section 4;p. 3.
"3rd Generation Partnership Project, Technical Specification Group Radio Access Network, NR, Medium Access Control (MAC) protocol specification (Release 15)", 38321-F40, Mobile Competence Centre, 650, Route Des Lucioles, F-06921 Sophia-Antipolis Cedex, France, Jan. 11, 2019, 77 Pages, 3GPP TS 38.321 V15.4.0 (Dec. 2018), XP051591686, Section 5.1, p. 13-p. 22, Section 6.1.5, p. 69-p. 70, Para. 5.18.8 and Para. 6.1.3.18.

* cited by examiner

TECHNIQUES FOR CONFIGURING RANDOM ACCESS TRANSMISSIONS

CROSS REFERENCE

The present application for patent claims the benefit of U.S. Provisional Patent Application No. 62/801,545 by OZTURK et al., entitled "TECHNIQUES FOR CONFIGURING RANDOM ACCESS TRANSMISSIONS," filed Feb. 5, 2019, assigned to the assignee hereof, and expressly incorporated herein.

BACKGROUND

The following relates generally to wireless communications, and more specifically to techniques for configuring random access transmissions.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, and apparatuses that support techniques for configuring random access channel (RACH) transmissions. Generally, the described techniques provide for a UE and a base station to choose between using a two-step RACH procedure and a four-step RACH procedure to establish a communication connection. For example, a UE or base station may be capable of performing a two-step RACH procedure and a 4-step RACH procedure, and therefore, be configured with a process for determining whether to perform a RACH procedure using the two-step or four-step procedure. In some cases, a UE may receive an initial message from a base station that is used to select a RACH procedure. In some cases, the initial message may be a broadcast of system information that includes a random access configuration message indicating a channel metric (e.g., received signal strength indicator (RSSI), reference signal received power (RSRP), reference signal received quality (RSRQ), a signal-to-noise ratio (SNR), signal-to-interference-plus-noise ratio (SINR), or the like) and a threshold associated with that metric. The UE may measure a reference signal (e.g., synchronization signal block (SSB), channel state information reference signal (CSI-RS), or the like) and select a RACH procedure based on comparing the measured channel metric to the threshold. For example, the UE may select a two-step RACH procedure if the measured channel metric satisfies the threshold specified in the configuration and select the four-step procedure if the channel metric fails to satisfy the threshold.

In some examples, selecting a RACH procedure (e.g., two-step or four-step) may be based on a quality of service (QoS) parameter. For example, a UE may receive a QoS parameter associated with a data flow between the UE and a base station and identify a priority level for the data flow. The UE may select a two-step RACH procedure for priority levels that are at or above a specified priority and select a four-step RACH procedure for priority levels that fall below the specified priority. Additionally or alternatively, a listen-before-talk (LBT) procedure may be selected or configured based on a QoS parameter.

In some cases, a RACH procedure may be selected based on information contained in a control signal. For example, a based station may send a control message (e.g., physical downlink control channel (PDCCH) message, media access control (MAC) control element, radio resource control (RRC) signal, or the like) indicating to the UE which RACH procedure to use. As such, the UE may initiate a RACH procedure with the base station according to the specified RACH procedure (e.g., two-step or four-step).

In further examples, a RACH procedure may be selected based on a payload size associated with a message. For example, the UE may determine that the payload size satisfies a threshold, for example, specified by the base station and select a two-step RACH procedure for establishing a communication connection. In some cases, the message may be sent as a result of establishing the communication connection. If the UE determines that the payload size of the message does not satisfy the threshold, then the UE may establish a connection with the base station using a four-step RACH procedure.

A method of wireless communications at a UE is described. The method may include receiving a random access configuration message over a wireless channel, the random access configuration message indicating a channel metric and a threshold, determining the channel metric based on receiving the random access configuration message, selecting a first random access procedure from a set of random access procedures based on the channel metric and the threshold indicated in the random access configuration message, and establishing a connection with a base station by performing the first random access procedure.

An apparatus for wireless communications at a UE is described. The apparatus may include a processor, memory in electronic communication with the processor, and instructions stored in the memory. The instructions may be executable by the processor to cause the apparatus to receive a random access configuration message over a wireless channel, the random access configuration message indicating a channel metric and a threshold, determine the channel metric based on receiving the random access configuration message, select a first random access procedure from a set of random access procedures based on the channel metric and the threshold indicated in the random access configuration message, and establish a connection with a base station by performing the first random access procedure.

Another apparatus for wireless communications at a UE is described. The apparatus may include means for receiving a random access configuration message over a wireless channel, the random access configuration message indicating a channel metric and a threshold, determining the channel metric based on receiving the random access configuration message, selecting a first random access procedure from a set of random access procedures based on the channel metric and the threshold indicated in the random access configuration message, and establishing a connection with a base station by performing the first random access procedure.

A non-transitory computer-readable medium storing code for wireless communications at a UE is described. The code may include instructions executable by a processor to receive a random access configuration message over a wireless channel, the random access configuration message indicating a channel metric and a threshold, determine the channel metric based on receiving the random access configuration message, select a first random access procedure from a set of random access procedures based on the channel metric and the threshold indicated in the random access configuration message, and establish a connection with a base station by performing the first random access procedure.

Some examples of the method, apparatuses, and non-transitory computer-readable medium described herein may further include operations, features, means, or instructions for identifying a reference signal based on the random access configuration message, where determining the channel metric includes receiving a measurement of the reference signal.

In some examples of the method, apparatuses, and non-transitory computer-readable medium described herein, the reference signal may include operations, features, means, or instructions for a synchronization signal block (SSB) or channel state information reference signal (CSI-RS).

In some examples of the method, apparatuses, and non-transitory computer-readable medium described herein, the channel metric may include operations, features, means, or instructions for a received signal strength indicator (RSSI), reference signal received power (RSRP), reference signal received quality (RSRQ), a SNR, or a signal-to-interference-plus-noise ratio (SINR).

In some examples of the method, apparatuses, and non-transitory computer-readable medium described herein, selecting the first random access procedure may include operations, features, means, or instructions for selecting between a two-step random access procedure and a four-step random access procedure based on the comparing the channel metric to the threshold.

Some examples of the method, apparatuses, and non-transitory computer-readable medium described herein may further include operations, features, means, or instructions for selecting the two-step random access procedure if the channel metric satisfies the threshold.

Some examples of the method, apparatuses, and non-transitory computer-readable medium described herein may further include operations, features, means, or instructions for selecting the four-step random access procedure if the channel metric fails to satisfy the threshold.

Some examples of the method, apparatuses, and non-transitory computer-readable medium described herein may further include operations, features, means, or instructions for receiving a timing advance, where the random access configuration message includes the timing advance, and selecting the first random access procedure includes selecting a two-step random access procedure as the first random access procedure based on the timing advance.

In some examples of the method, apparatuses, and non-transitory computer-readable medium described herein, the random access configuration message includes an indication of the timing advance.

In some examples of the method, apparatuses, and non-transitory computer-readable medium described herein, the random access configuration message may be received during a connected mode and the timing advance may be determined based on an uplink time.

Some examples of the method, apparatuses, and non-transitory computer-readable medium described herein may further include operations, features, means, or instructions for identifying a reference signal based on the random access configuration message, where the timing advance may be estimated based on the reference signal.

Some examples of the method, apparatuses, and non-transitory computer-readable medium described herein may further include operations, features, means, or instructions for selecting a four-step random access procedure as the first random access procedure based on a failure to determine a timing advance from the random access configuration message.

Some examples of the method, apparatuses, and non-transitory computer-readable medium described herein may further include operations, features, means, or instructions for receiving a random access capability received from the base station, and determining a cell reselection priority based on the random access capability.

In some examples of the method, apparatuses, and non-transitory computer-readable medium described herein, the random access capability may be received in a master information block (MIB) signal and the cell reselection priority may be based on the random access capability indicating a two-step random access procedure.

A method of wireless communications at a base station is described. The method may include transmitting a random access configuration message over a wireless channel, the random access configuration message indicating a channel metric and threshold to be used for selecting a random access procedure, receiving a random access message received according to a first random access procedure of a set of random access procedures, and establishing a connection with a UE by performing the first random access procedure.

An apparatus for wireless communications at a base station is described. The apparatus may include a processor, memory in electronic communication with the processor, and instructions stored in the memory. The instructions may be executable by the processor to cause the apparatus to transmit a random access configuration message over a wireless channel, the random access configuration message indicating a channel metric and threshold to be used for selecting a random access procedure, receive a random access message received according to a first random access procedure of a set of random access procedures, and establish a connection with a UE by performing the first random access procedure.

Another apparatus for wireless communications at a base station is described. The apparatus may include means for transmitting a random access configuration message over a wireless channel, the random access configuration message indicating a channel metric and threshold to be used for selecting a random access procedure, receiving a random access message received according to a first random access procedure of a set of random access procedures, and establishing a connection with a UE by performing the first random access procedure.

A non-transitory computer-readable medium storing code for wireless communications at a base station is described. The code may include instructions executable by a processor to transmit a random access configuration message over a wireless channel, the random access configuration message indicating a channel metric and threshold to be used for selecting a random access procedure, receive a random access message received according to a first random access procedure of a set of random access procedures, and establish a connection with a UE by performing the first random access procedure.

Some examples of the method, apparatuses, and non-transitory computer-readable medium described herein may further include operations, features, means, or instructions for indicating, in the channel metric, a reference signal to be measured for selecting the random access procedure.

In some examples of the method, apparatuses, and non-transitory computer-readable medium described herein, the indicated reference signal may include operations, features, means, or instructions for a synchronization signal block (SSB) or channel state information reference signal (CSI-RS).

In some examples of the method, apparatuses, and non-transitory computer-readable medium described herein, the channel metric may include operations, features, means, or instructions for a received signal strength indicator (RSSI), reference signal received power (RSRP), reference signal received quality (RSRQ), a signal-to-noise ration (SNR), or signal-to-interference-plus-noise ration (SINR).

Some examples of the method, apparatuses, and non-transitory computer-readable medium described herein may further include operations, features, means, or instructions for indicating, in the random access configuration message, that the UE may be to use a two-step random access procedure if the channel metric satisfies the threshold.

Some examples of the method, apparatuses, and non-transitory computer-readable medium described herein may further include operations, features, means, or instructions for indicating, in the random access configuration message, that the UE may be to use a four-step random access procedure if the channel metric does not satisfy the threshold.

Some examples of the method, apparatuses, and non-transitory computer-readable medium described herein may further include operations, features, means, or instructions for transmitting a random access capability in a first signal, the random access capability indicating one or more random access procedures supported by a base station.

In some examples of the method, apparatuses, and non-transitory computer-readable medium described herein, the first signal may include operations, features, means, or instructions for a master information block or a signal information block.

A method of wireless communications at a UE is described. The method may include determining a quality of service parameter associated with a data flow between the UE and a base station, identifying a priority level associated with the data flow based on the quality of service parameter, selecting a first random access procedure from a set of random access procedures based on the identified priority level, and establishing a connection with the base station by performing the first random access procedure.

An apparatus for wireless communications at a UE is described. The apparatus may include a processor, memory in electronic communication with the processor, and instructions stored in the memory. The instructions may be executable by the processor to cause the apparatus to determine a quality of service parameter associated with a data flow between the UE and a base station, identify a priority level associated with the data flow based on the quality of service parameter, select a first random access procedure from a set of random access procedures based on the identified priority level, and establish a connection with the base station by performing the first random access procedure.

Another apparatus for wireless communications at a UE is described. The apparatus may include means for determining a quality of service parameter associated with a data flow between the UE and a base station, identifying a priority level associated with the data flow based on the quality of service parameter, selecting a first random access procedure from a set of random access procedures based on the identified priority level, and establishing a connection with the base station by performing the first random access procedure.

A non-transitory computer-readable medium storing code for wireless communications at a UE is described. The code may include instructions executable by a processor to determine a quality of service parameter associated with a data flow between the UE and a base station, identify a priority level associated with the data flow based on the quality of service parameter, select a first random access procedure from a set of random access procedures based on the identified priority level, and establish a connection with the base station by performing the first random access procedure.

Some examples of the method, apparatuses, and non-transitory computer-readable medium described herein may further include operations, features, means, or instructions for determining a listen before talk (LBT) procedure associated with the first random access procedure, and configuring the LBT procedure based on the identified priority level associated with the data flow.

Some examples of the method, apparatuses, and non-transitory computer-readable medium described herein may further include operations, features, means, or instructions for receiving a paging message received from the base station, where the paging message includes an indication of the quality of service parameter.

Some examples of the method, apparatuses, and non-transitory computer-readable medium described herein may further include operations, features, means, or instructions for selecting a two-step random access procedure for the first random access procedure based on the priority level, and configuring a random access message for transmission via the two-step random access procedure.

In some examples of the method, apparatuses, and non-transitory computer-readable medium described herein, the random access message may include operations, features, means, or instructions for a buffer status report (BSR) or message data.

Some examples of the method, apparatuses, and non-transitory computer-readable medium described herein may further include operations, features, means, or instructions for selecting the first random access procedure based on a connection procedure, where the connection procedure includes one or more of: a beam failure recovery, handover completion, system information (SI) request, radio resource connection (RRC) establishment, or RRC resume.

A method of wireless communications at a base station is described. The method may include transmitting an indication of a quality of service parameter associated with a data flow between a UE and the base station, the quality of service parameter indicating a priority level associated with the data flow, identifying a first random access procedure of a set of random access procedures based on the quality of service parameter, and establishing a connection with the UE by performing the first random access procedure.

An apparatus for wireless communications at a base station is described. The apparatus may include a processor, memory in electronic communication with the processor, and instructions stored in the memory. The instructions may be executable by the processor to cause the apparatus to transmit an indication of a quality of service parameter associated with a data flow between a UE and the base station, the quality of service parameter indicating a priority level associated with the data flow, identify a first random access procedure of a set of random access procedures based on the quality of service parameter, and establish a connection with the UE by performing the first random access procedure.

Another apparatus for wireless communications at a base station is described. The apparatus may include means for transmitting an indication of a quality of service parameter associated with a data flow between a UE and the base station, the quality of service parameter indicating a priority level associated with the data flow, identifying a first random access procedure of a set of random access procedures based on the quality of service parameter, and establishing a connection with the UE by performing the first random access procedure.

A non-transitory computer-readable medium storing code for wireless communications at a base station is described. The code may include instructions executable by a processor to transmit an indication of a quality of service parameter associated with a data flow between a UE and the base station, the quality of service parameter indicating a priority level associated with the data flow, identify a first random access procedure of a set of random access procedures based on the quality of service parameter, and establish a connection with the UE by performing the first random access procedure.

Some examples of the method, apparatuses, and non-transitory computer-readable medium described herein may further include operations, features, means, or instructions for indicating, a listen before talk (LBT) procedure associated with the first random access procedure, where the LBT procedure may be based on the quality of service parameter associated with the data flow.

In some examples of the method, apparatuses, and non-transitory computer-readable medium described herein, transmitting the quality of service parameter may include operations, features, means, or instructions for transmitting a paging message to the UE, the paging message including the quality of service parameter.

Some examples of the method, apparatuses, and non-transitory computer-readable medium described herein may further include operations, features, means, or instructions for indicating a two-step random access procedure for the first random access procedure based on the priority level, and configuring a random access response according to the two-step random access procedure.

A method of wireless communications at a UE is described. The method may include receiving a control message from a base station, the control message indicating a first random access procedure from a set of random access procedures to be used for configuring a random access message and establishing a connection with the base station by performing the first random access procedure.

An apparatus for wireless communications at a UE is described. The apparatus may include a processor, memory in electronic communication with the processor, and instructions stored in the memory. The instructions may be executable by the processor to cause the apparatus to receive a control message from a base station, the control message indicating a first random access procedure from a set of random access procedures to be used for configuring a random access message and establish a connection with the base station by performing the first random access procedure.

Another apparatus for wireless communications at a UE is described. The apparatus may include means for receiving a control message from a base station, the control message indicating a first random access procedure from a set of random access procedures to be used for configuring a random access message and establishing a connection with the base station by performing the first random access procedure.

A non-transitory computer-readable medium storing code for wireless communications at a UE is described. The code may include instructions executable by a processor to receive a control message from a base station, the control message indicating a first random access procedure from a set of random access procedures to be used for configuring a random access message and establish a connection with the base station by performing the first random access procedure.

In some examples of the method, apparatuses, and non-transitory computer-readable medium described herein, the control message may include operations, features, means, or instructions for a paging message, PDCCH message, MAC control element, or RRC signaling.

Some examples of the method, apparatuses, and non-transitory computer-readable medium described herein may further include operations, features, means, or instructions for identifying a listen before talk (LBT) procedure associated with the random access message indicated in the control message, and configuring an LBT operation to be performed prior to transmitting the random access message based on identifying the LBT procedure.

In some examples of the method, apparatuses, and non-transitory computer-readable medium described herein, the LBT procedure may be configured based on a priority associated with the first random access procedure.

A method of wireless communications at a base station is described. The method may include transmitting a control message to a UE, the control message indicating a first random access procedure from a set of random access procedures to be used for configuring a random access message and establishing a connection with the UE by performing the first random access procedure.

An apparatus for wireless communications at a base station is described. The apparatus may include a processor, memory in electronic communication with the processor, and instructions stored in the memory. The instructions may be executable by the processor to cause the apparatus to transmit a control message to a UE, the control message indicating a first random access procedure from a set of random access procedures to be used for configuring a random access message and establish a connection with the UE by performing the first random access procedure.

Another apparatus for wireless communications at a base station is described. The apparatus may include means for transmitting a control message to a UE, the control message indicating a first random access procedure from a set of random access procedures to be used for configuring a random access message and establishing a connection with the UE by performing the first random access procedure.

A non-transitory computer-readable medium storing code for wireless communications at a base station is described. The code may include instructions executable by a processor to transmit a control message to a UE, the control message indicating a first random access procedure from a set of random access procedures to be used for configuring a random access message and establish a connection with the UE by performing the first random access procedure.

In some examples of the method, apparatuses, and non-transitory computer-readable medium described herein, the first random access procedure may be a two-step random access procedure, and the control message includes one or more of: a paging message, PDCCH message, MAC CE message, or RRC signaling.

Some examples of the method, apparatuses, and non-transitory computer-readable medium described herein may further include operations, features, means, or instructions for indicating a listen before talk (LBT) procedure to be performed in association with the first random access procedure, where the LBT procedure based on a priority associated with the first random access procedure.

A method of wireless communications at a UE is described. The method may include identifying a message to be transmitted by the UE, determining a payload size associated with the message, selecting a first random access procedure from a set of random access procedures based on determining the payload size, and establishing a connection with the base station by performing the first random access procedure.

An apparatus for wireless communications at a UE is described. The apparatus may include a processor, memory in electronic communication with the processor, and instructions stored in the memory. The instructions may be executable by the processor to cause the apparatus to identify a message to be transmitted by the UE, determine a payload size associated with the message, select a first random access procedure from a set of random access procedures based on determining the payload size, and establish a connection with the base station by performing the first random access procedure.

Another apparatus for wireless communications at a UE is described. The apparatus may include means for identifying a message to be transmitted by the UE, determining a payload size associated with the message, selecting a first random access procedure from a set of random access procedures based on determining the payload size, and establishing a connection with the base station by performing the first random access procedure.

A non-transitory computer-readable medium storing code for wireless communications at a UE is described. The code may include instructions executable by a processor to identify a message to be transmitted by the UE, determine a payload size associated with the message, select a first random access procedure from a set of random access procedures based on determining the payload size, and establish a connection with the base station by performing the first random access procedure.

Some examples of the method, apparatuses, and non-transitory computer-readable medium described herein may further include operations, features, means, or instructions for receiving a random access configuration message over a wireless channel, the random access configuration message indicating a payload threshold, and selecting between a two-step random access procedure and a four-step random access procedure based on the comparing the payload size to the payload threshold.

Some examples of the method, apparatuses, and non-transitory computer-readable medium described herein may further include operations, features, means, or instructions for selecting the two-step random access procedure if the payload size satisfies the threshold.

Some examples of the method, apparatuses, and non-transitory computer-readable medium described herein may further include operations, features, means, or instructions for selecting the four-step random access procedure if the payload size fails to satisfy the threshold.

A method of wireless communications at a base station is described. The method may include transmitting an indication of a payload threshold associated with a data transmission between a UE and the base station, the payload threshold indicating a payload size associated with the data transmission, identifying a first random access procedure of a set of random access procedures based on the payload size, and establishing a connection with the UE by performing the first random access procedure.

An apparatus for wireless communications at a base station is described. The apparatus may include a processor, memory in electronic communication with the processor, and instructions stored in the memory. The instructions may be executable by the processor to cause the apparatus to transmit an indication of a payload threshold associated with a data transmission between a UE and the base station, the payload threshold indicating a payload size associated with the data transmission, identify a first random access procedure of a set of random access procedures based on the payload size, and establish a connection with the UE by performing the first random access procedure.

Another apparatus for wireless communications at a base station is described. The apparatus may include means for transmitting an indication of a payload threshold associated with a data transmission between a UE and the base station, the payload threshold indicating a payload size associated with the data transmission, identifying a first random access procedure of a set of random access procedures based on the payload size, and establishing a connection with the UE by performing the first random access procedure.

A non-transitory computer-readable medium storing code for wireless communications at a base station is described. The code may include instructions executable by a processor to transmit an indication of a payload threshold associated with a data transmission between a UE and the base station, the payload threshold indicating a payload size associated with the data transmission, identify a first random access procedure of a set of random access procedures based on the payload size, and establish a connection with the UE by performing the first random access procedure.

DETAILED DESCRIPTION

Figure 1:
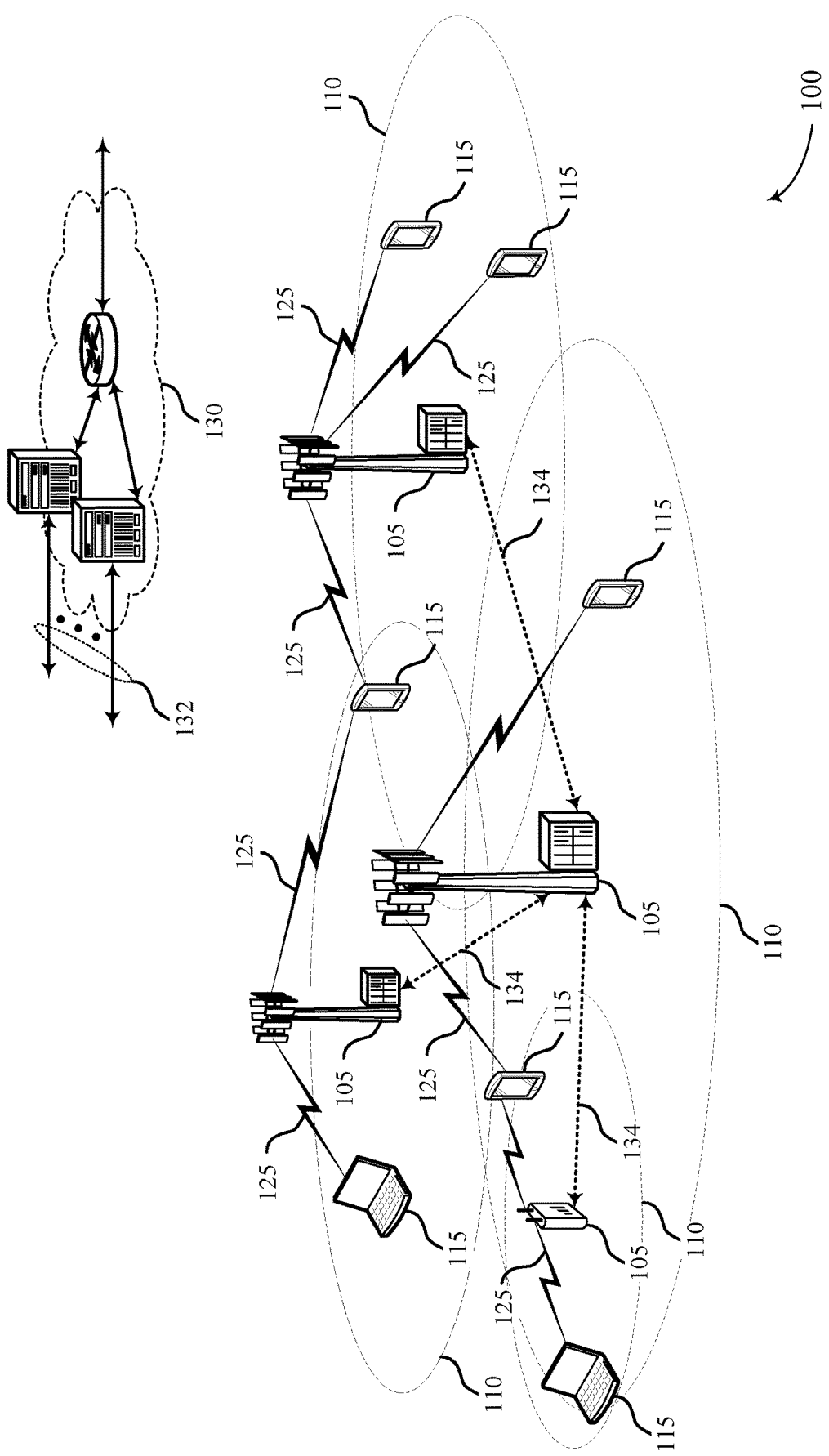
FIG. 1 illustrates an example of a system for wireless communications that supports techniques for configuring random access transmissions in accordance with aspects of the present disclosure.

Wireless devices operating within a wireless network may use a two-step RACH procedure or a four-step RACH procedure to initiate a communications connection, perform handover, adjust a network connection, switch from an idle mode to a connected mode, etc. In some cases, a two-step RACH procedure may reduce delay in establishing a communication connection between a UE and a base station, for example, due to the decreased number of message exchanges. In cases where signal quality is low, a four-step RACH may have better success in establishing a connection, for example, due to receiving an explicit timing advance (TA) in message 3. A UE and base station may be configured to perform both two-step and four-step RACH. In some aspects, the UE may select between different RACH procedures (e.g., two-step RACH or four-step RACH) based on one or more configuration parameters received from a base station. As such, a delay in completion of a random access procedure may cause delays in subsequent communications, and efficient techniques are therefore desired for random access communications.

Aspects of the disclosure include a base station transmitting a configuration message to the UE for selecting a RACH procedure. The UE may receive the configuration message and determine a process for selecting a RACH procedure. For example, the configuration message may indicate a channel metric (e.g., RSSI, RSRP, RSRQ, SNR, SINR, or the like) and a threshold. The UE may receive a measurement of a reference signal (e.g., SSB, CSI-R, or the like) associated with the channel metric and compare the measurement to the threshold. In some cases, the UE may determine that the measured channel metric satisfies the threshold and select a first RACH procedure (e.g., two-step RACH). In some cases, the UE may determine that the channel metric fails to satisfy the threshold and select a second RACH procedure (e.g., four-step RACH). The UE may send an initial RACH message (e.g., message A for two-step RACH or message 1 for four-step RACH) based on the selected procedure and establish a communications connection with the base station.

Aspects of the disclosure further include the UE selecting a RACH procedure based on a QoS parameter, TA, explicit signaling from the base station, or the like. For example, the UE may receive a paging message, control signal, or the like indicating a QoS parameter or LBT parameter. In this regard, the UE may select a first RACH procedure (e.g., two-step RACH or four-step RACH) based on the QoS parameter or LBT parameter. In some aspects, the UE may select a RACH procedure based on the size of a message payload. For example, the UE may select a two-step RACH procedure for small payloads (e.g., micro machine type communications (mMTC)) to reduce signaling overhead.

Aspects of the disclosure are initially described in the context of a wireless communications systems. Aspect of the disclosure are then described in the context of a process flow diagram. Aspects of the disclosure are further illustrated by and described with reference to apparatus diagrams, system diagrams, and flowcharts that relate to techniques for configuring random access transmissions.

FIG. 1 illustrates an example of a wireless communications system 100 that supports techniques for configuring random access transmissions in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30{,}720{,}000$ seconds. Time intervals of a communications resource may be organized according to radio frames each having a duration of 10 milliseconds (ms), where the frame period may be expressed as $T_f=307{,}200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Wireless devices operating in licensed or unlicensed spectrum within an NR network may participate in a two-step RACH procedure or a four-step RACH procedure to establish an initial connection or to re-establish a connection with a base station 105. A two-step RACH procedure may decrease the time it takes for the UE 115 and base station 105 to establish a connection as compared to a four-step RACH procedure. For example, when the UE 115 is performing LBT procedures in associations with the RACH procedure, the two-step RACH procedure may reduce delay in establishing a connection due to the decreased number of LBT procedures associated with the two-step process. In some cases, a four-step RACH procedure may increase the chances that the UE 115 is able to successfully establish a communication link 125 with the base station 105, for example if signal quality is poor.

The four-step RACH procedure may generally include an exchange of four messages between a UE 115 and a base station 105. In the four-step procedure, a UE 115 may initiate the RACH procedure by sending a random access request (e.g., message 1) to a base station 105. The random access request may include a RACH preamble, which may indicate a random access radio network temporary identification (RA-RNTI), an indication for the layer 2/layer 3 (L2/L3) message size, or both. The base station 105 may send a random access response (e.g., message 2) that may include an UL grant, timing advance, the RA-RNTI from the random access request, or any combination of these factors. Using the UL grant, UE 115 may send a third message (e.g., message 3), which may include or be an example of a radio resource connection (RRC) connection request to base station 105. In some cases, a risk of contention or ambiguity between two UEs 115 may exist if both UEs 115 initiated the RACH procedure using the same resource blocks and preamble sequences. The RRC message sent by a first UE 115 and the other UE 115 may each include an identifier (e.g., S-TMSI or random number) that uniquely identifies the respective UE 115. In some cases, the RRC transmission from UE 115 will be stronger and base station 105 will decode this transmission while the RRC transmission from the other UE 115 will only cause interference. Base station 105 may then send a fourth message (e.g., message 4) that can resolve the contention between the two UEs 115, such as by transmitting the identifier (e.g., the random number) of the UE 115 that was indicated by that UE 115 in the RRC connection request. As a result, UE 115 and base station 105 can establish a communication connection.

A two-step RACH procedure may include the UE 115 sending a first message (e.g., message A) to the base station 105, which may combine the contents of the RACH message 1 and message 3 from the four-step RACH process. Additionally, message A may consist of a physical uplink shared channel (PUSCH) carrying a payload with the contents of the message (e.g., equivalent to message 3), where the preamble and payload may be transmitted on separate waveforms. In some cases, the base station 105 may transmit a downlink control channel (e.g., PDCCH) and a corresponding second RACH message (e.g., message B) to the UE 115, where message B may combine the equivalent contents of a RACH message 2 and message 4 from the four-step procedure. Such a two-step procedure may reduce signaling overhead and latency of communications between the base station 105 and UE 115 as compared to the four-step RACH process. In some cases, the two-step RACH procedure may be used when a UE 115 is sending a relatively small data transmission (e.g., mMTC).

In accordance with aspects of the present disclosure, the UE 115 may select between a two-step RACH procedure and a four-step RACH procedure based on one or more parameters associated with transmission between the UE 115 and base station 105. For example, a base station 105 may send an initial message to the UE 115 indicating to the UE 115 a procedure for selecting between a two-step RACH process and a four-step RACH process. In some cases, the initial message may be a configuration message indicating a channel metric (e.g., RSSI, RSRP, RSRQ, SNR, SINR, or the like) and threshold for the UE to use in determining which RACH procedure to use. The UE 115 may measure a reference signal (e.g., SSB, CSI-RS, or the like) to determine the channel metric and choose a RACH procedure based on comparing the channel metric to the threshold. In some cases, the UE may choose a RACH procedure based on a QoS parameter, for example, indicating a priority level associated with a data flow between a UE 115 and a base station 105. In additional examples, the initial message sent by the base station 105 may specify which RACH procedure that the UE 115 is to use in communicating with the base station 105. In some cases, the UE 115 may choose or the base station 105 may indicate which RACH procedure to use based on a payload size of a message.

In some cases this may increase the efficiency (e.g., decrease delay/latency, decrease signaling overhead, increase reliability, etc.) of communications between a UE 115 and base station 105. For example, in cases where signal quality is high (e.g., UE determines that an RSRP for an SSB signal is above a threshold), selecting a two-step RACH procedure may reduce the signaling overhead by requiring an exchange of two RACH messages instead of four as compared to a four-step RACH procedure. Further, using a two-step RACH may result in a UE 115 performing less LBT procedures as compared to the four-step RACH procedure. In situations where the signal quality is low (e.g., UE determines that an RSRP for an SSB signal is below a threshold) a four-step RACH may be more likely to establish a connection with a base station 105 as compared to a two-step RACH procedure. In this regard, a UE 115 and base station 105 may increase efficiency by selecting a RACH procedure based on current network conditions (e.g., signal quality, amount of contention, UE or base station capabilities, or the like).

In some cases, identifying a reference signal (e.g., SSB, CSI-RS, or the like) based on the random access configuration message may contribute to increased communications efficiency. For example, the reference signals may be received by the UE for other purposes, and thus, using these reference signals such as an SSB or CSI-RS doesn't require any additional signaling between a UE 115 and base station 105 for selecting a RACH procedure. Accordingly, the UE 115 may obtain current network conditions for selecting a RACH procedure without increasing signaling overhead by determining the channel metric by receiving a measurement of the reference signal (e.g., RSSI, RSRP, RSRQ, SNR, SINR, or the like).

Figure 2:
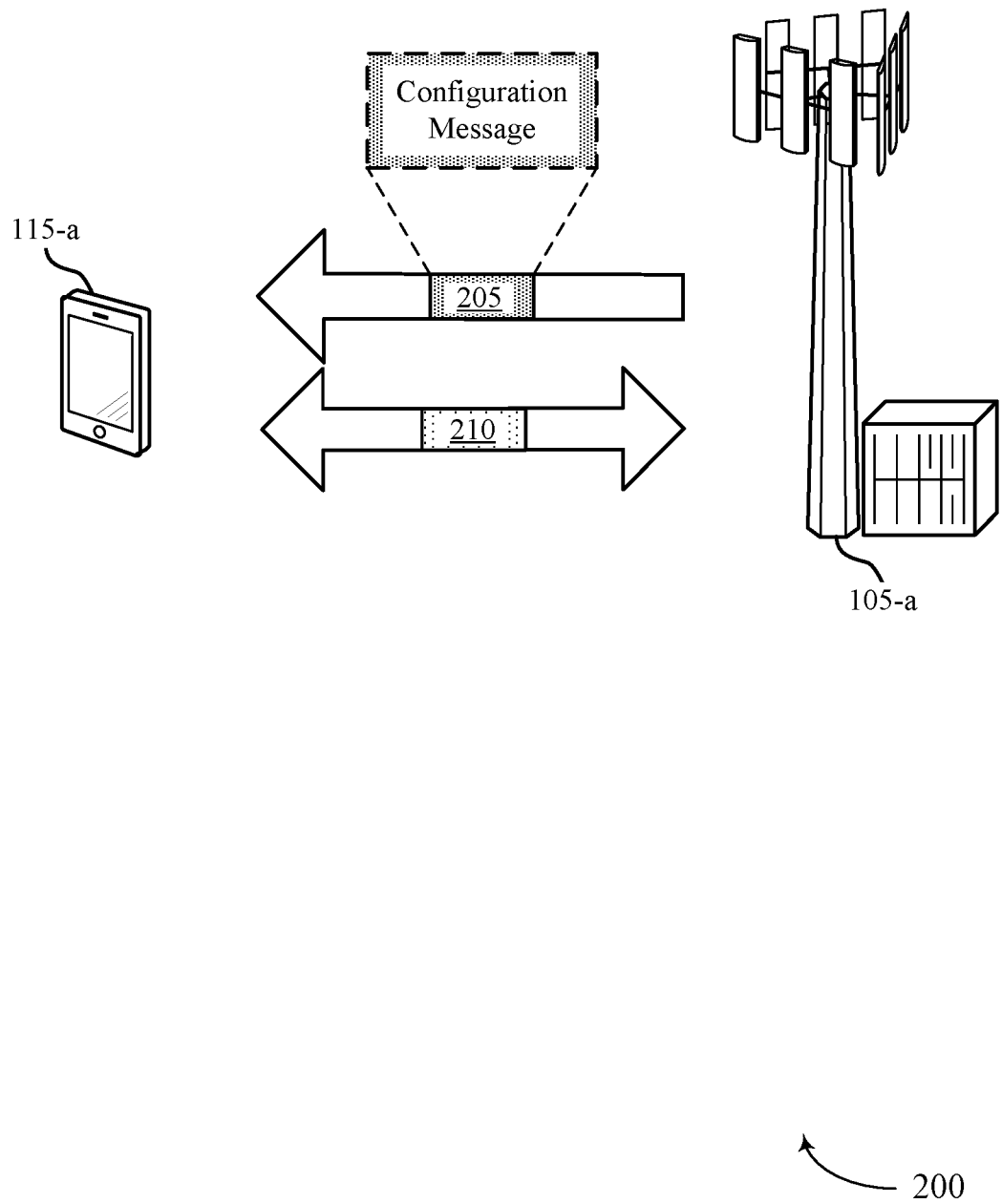
FIG. 2 illustrates an example of a system for wireless communications that supports techniques for configuring random access transmissions in accordance with aspects of the present disclosure.

FIG. 2 illustrates an example of a system for wireless communications 200 that supports techniques for configuring random access transmissions in accordance with aspects of the present disclosure. In some examples, the system for wireless communications 200 may implement aspects of wireless communications system 100. The wireless communications system 200 may include a base station 105-*a* and a UE 115-*a*, which may be examples of a base station 105 or UE 115 described with reference to FIG. 1. The wireless communications system 200 illustrate an example of a RACH configuration procedure where the base station 105-*a* transmits a configuration message 205 to the UE 115-*a*, the UE 115-*a* selects a RACH procedure (e.g., a two-step or a four-step) based on the configuration message 205, and the UE 115-*a* and base station 105-*a* exchange RACH messages 210 to perform the selected RACH procedure. A communication connection may be established based on the UE 115-*a* and the base station 105-*a* performing the selected RACH procedure. The RACH procedure can be initiated in a variety of situations, for example, during the establishment of a radio resource control (RRC) connection, during handover of UE 115-*a*, if UE 115-*a* has lost synchronization timing with base station 105-*a*, if the UE 115-*a* transitions from an idle state to an active state, or in other situations where the UE 115-*a* is initiating communication with base station 105-*a*, but has not been assigned or does not have predetermined resources to do so.

To select a RACH procedure for establishing a connection between the UE 115-*a* and the base station 105-*a*, the base station 105-*a* may send a configuration message 205 that is received by the UE 115-*a*. The configuration message 205 may be broadcast in a systems information block (SIB), transmitted over dedicate signaling, for example, an RRC reconfiguration signal or RRC release signal, or the like. In some examples, the configuration message 205 may indicate a channel metric that the UE 115-*a* should use in determining which RACH procedure (e.g., two-step, four-step, or the like) to select. Additionally, the configuration message may indicate a threshold associated with the channel metric. In some cases, the UE 115-*a* may determine from the threshold or channel metric a reference signal to measure. For example, the UE 115-*a* may identify a reference signal such as an SSB, CSI-RS, or the like to measure for determining the channel metric. In some cases, determining the channel metric includes calculating a RSSI, RSRP, RSRQ, SNR, SINR or a combination thereof. In some examples, the UE 115-*a* may measure or calculate multiple channel metrics for one or more reference signals.

In some cases, the UE 115-*a* may compare the determined channel metric to the threshold indicated in the configuration message 205. For example, the UE 115-*a* may compare the determined channel metric (e.g., RSRP value from a SSB signal) to the threshold. The UE may select a two-step RACH process if the channel metric (e.g., the channel quality) is at or above the threshold. In this case, this may result in the channel metric being deemed to satisfy the threshold. In some cases, the UE 115-*a* may determine that the channel metric is at or below the threshold and select a four-step RACH process. In this case, this may result in the channel metric being deemed to fail to satisfy the threshold. The UE 115-*a* may configure a first RACH message (e.g., message A or message 1) for transmission to the base station 105-*a* based on the selected RACH process.

In some cases, the UE 115-*a* may select a RACH process based on determining a timing advance (TA) for communicating with the base station 105-*a*. For example, the UE 115-*a* may determine or estimate a timing advance based on the configuration message 205. If the UE 115-*a* is able to estimate the TA, then the UE may select a two-step RACH procedure. In some cases, the UE 115-*a* may be in a connected mode with the base station 105-*a* and determine a TA based on the UL timer. Accordingly, the UE 115-*a* may use this TA to initiate a two-step RACH procedure with the base station 105-*a*. In other examples, the UE 115-*a* may estimate the TA based on the configuration message 205. For example, the configuration may include a synchronization signal block (SSB), and the UE 115-*a* may determine a quality parameter, for example, a RSRP for the SSB. As such, the UE 115-*a* may be able to estimate a TA based on the RSRP and configure a two-step RACH procedure based on estimating the TA. In some examples, the UE 115-*a* may not receive an indication of the TA or may not be able to estimate the TA and select a four-step RACH procedure as a result.

In some examples, the UE 115-*a* may be configured to select a RACH procedure based on determining a RACH capability of the base station 105-*a*. For example, the base station 105-*a* may only support a single RACH procedure, for example, either a two-step RACH procedure or a four-step RACH procedure. The UE 115-*a* may be configured to prioritize camping or connecting to a base station that supports two-step RACH procedures. Thus, in this case, the UE 115-*a* may prioritize searching for or camping on a cell/base station (not shown) that supports two-step RACH procedures. In some cases, the UE 115-*a* may establish a connection with a base station that only supports a four-step RACH procedure (e.g., base station 105 in this example), but configure a cell reselection priority to a base station that supports a two-step RACH procedure. The UE 115-*a* may receive an indication of the base station 105-*a* in a signal or message received from the base station 105-*a*. For example, the base station 105-*a* may advertise its RACH procedure capabilities in a master information block (MIB), SIB, or the like.

A RACH procedure may be selected or configured based on QoS parameters associated with data flows between the UE 115-*a* and base station 105-*a*. In some examples, selecting a RACH procedure may include identifying a priority level associated with a QoS parameter. For example, the UE 115-*a* may have performed an initial attachment to the base station 105-*a*, and configured one or more data bearers having associated QoS flows. The UE 115-*a* may then enter an inactive or idle mode. If the UE 115-*a* attempts to re-establish communications with the base station 105-*a*, the UE 115-*a* may identify a QoS parameter and priority level associated with the data that will be transmitted. In some cases, the UE 115-*a* may select a two-step RACH based on the data transmission being associated with a specific priority level. Additionally, the UE 115-*a* may transmit the data in the RACH procedure, for example, in message A. In this regard, data bearers with high QoS parameters may reduce signaling and reduce delay in transmitting data transmission with specific priority levels. In some cases, the UE 115-*a* may select a RACH procedure based on a type of control information that the UE 115-*a* will transmit to the base station 105-*a*. For example, the UE 115-*a* may select a two-step RACH process to transmit a buffer status report (BSR) to the base station 105-*a*. In some cases, the BSR may be transmitted in message A of a two-step RACH procedure. Accordingly, selecting a two-step RACH may reduce delay because the base station 105-*a* may allocate dedicated resources for data transmissions from the UE 115-*a*.

In some cases, the a QoS parameter may be indicated in an initial message transmitted by the base station 105-*a* to the UE 115-*a*. For example, the configuration message 205 may be a paging message that indicates a priority level for data that the base station 105-*a* is going to transmit to the UE 115-*a*. The UE 115-*a* may select a RACH procedure based on the priority level associated with the paging message (e.g., configuration message 205). For example, the UE 115-*a* may select a two-step RACH procedure for higher data with a higher priority level to reduce delay associated with establishing a connection to transmit the data.

Additionally or alternatively, a LBT procedure may be selected or configured at the UE based on the RACH procedure selected, a priority level indicated by a QoS parameter, an LBT parameter specified in a paging message, or the like. For example, if the UE 115-*a* selects a two-step RACH based on a priority level specified in a paging message, the UE 115-*a* may also select a higher priority LBT procedure (e.g., lower category) to further reduce delay in performing the RACH procedure. In some cases, the RACH procedure or LBT procedure may be selected by the UE 115-*a* based on a reason the RACH procedure is initiated. For example, the UE 115-*a* may be configured to select a specific RACH procedure (e.g., two-step or four-step) based on the RACH procedure being used to initiate a beam failure recovery, handover completion, system information (SI) request, or the like.

In some cases, an initial message, such as the configuration message 205 transmitted by the base station 105-*a* may indicate the RACH procedure that the UE 115-*a* should use for establishing a connection with the base station 105-*a*. For example, the configuration message 205 may be a paging message and indicate that the UE 115-*a* should use a two-step or four-step RACH procedure. In further examples, the initial RACH procedure may be indicated in a PDCCH, MAC-CE, RRC signaling, control signaling, or the like. In these cases, the UE 115-*a* and base station 105-*a* may exchange RACH messages 210 according to the selected RACH procedure.

Figure 3:
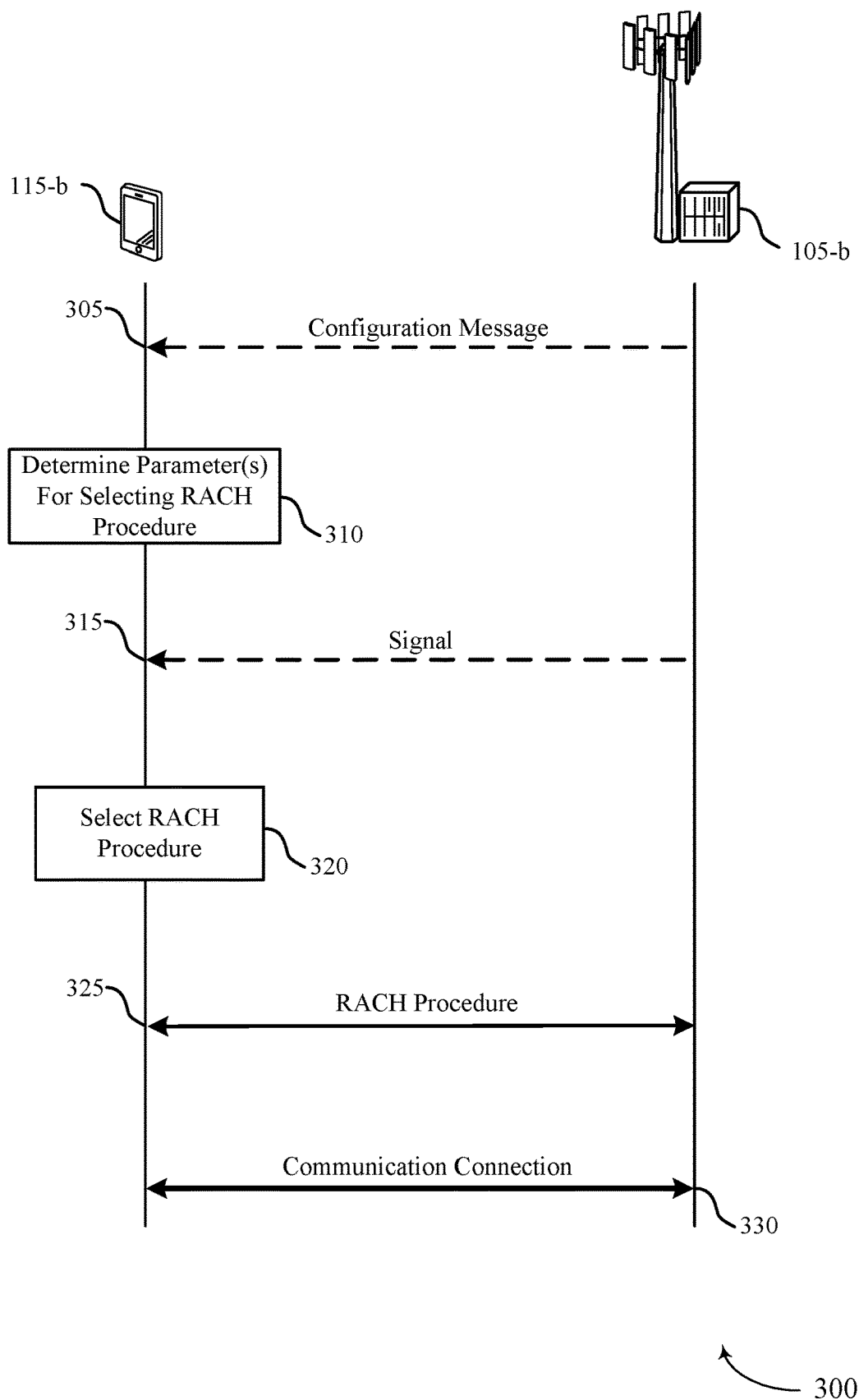
FIG. 3 illustrates an example of a process flow that supports techniques for configuring random access transmissions in accordance with aspects of the present disclosure.

FIG. 3 illustrates an example of a process flow 300 that supports techniques for configuring random access transmissions in accordance with aspects of the present disclosure. In some examples, the process flow 300 may implement aspects of wireless communications system 100 or 200 described with reference to FIGS. 1 and 2. The process flow 300 includes functions and communications implemented by base station 105-*b* and UE 115-*b* in the context of selecting a RACH procedure, which may be examples of the base station 105 and UEs 115 described with reference to FIGS. 1 and 2.

At 305, base station 105-*b* may transmit a configuration message to the UE 115-*b*. The configuration message may include one or more parameters or signals that the UE 115-*b* may use to select a RACH procedure for establishing a communication connection with the base station 105-*b*. The configuration message may indicate a channel metric (e.g., RSSI, RSRP, RSRQ, SNR, SINR, or the like) and threshold for the UE 115-*b* to use in selecting a RACH procedure. In some examples, the configuration message could include a paging message or control signal such as a PDCCH, MAC CE, RRC signaling, or the like. In any case, the configuration message may indicate a QoS parameter, LBT procedure (e.g., LBT category), a TA, or the like that the UE 115-*b* may use to select a RACH procedure. In some examples, the configuration message may explicitly indicate to the UE 115-*b* which RACH procedure to use (e.g., two-step or four-step). In further cases, the configuration message could include an indication of the RACH procedures supported by the base station 105-*b*. This information could be transmitted in a MIB, SIB, or the like.

In some cases, the UE 115-*b* and base station 105-*b* could be configured with default/initial RACH configuration parameters as described herein. For example, the UE 115-*b* could be configured to monitor a specific reference signal (e.g., SSB) and measure a specified channel metric (e.g., RSRP). In this regard, the UE 115-*b* may also have a default threshold for determining which RACH procedure to select based on the measured channel metric. In some cases, the configuration message could update or change one or more of these default RACH configuration parameters for the UE 115-*b*. Further, the UE 115-*b* could be configured with multiple different configuration parameters for selecting a RACH procedure. In this regard, the configuration message may indicate a priority of which procedure should be used.

At 310, the UE 115-*b* may determine one or more parameters to be used for selecting a RACH procedure based on receiving the configuration message. In examples where the configuration message indicates a channel metric and threshold, the UE 115-*b* may determine a reference signal (e.g., SSB, CSI-RS, or the like) that it will measure to calculate/estimate the channel metric. In examples where the configuration message is a paging message, the UE may determine that a QoS metric or associated priority level is to be used in selecting the RACH procedure. In some cases, the paging message may indicate the RACH procedure that the UE 115-*b* is to use. In other examples, the UE 115-*b* may determine whether it can calculate/estimate a TA based on the configuration message or other signals (e.g., UL timer in connected mode), and select a RACH procedure (e.g., two-step RACH) based on being able to determine or estimate the TA.

The UE 115-*b* may also determine an LBT procedure based on the contents of the configuration message. For example, the UE 115-*b* may be configured to select a specific LBT procedure (e.g., category 2) based on a QoS or priority level in the configuration message. In other cases, the UE 115-*b* may select an LBT procedure based on which RACH procedure was selected. For example, if the UE 115-*a* selects a two-step RACH procedure then the UE 115-*b* may also use a higher priority LBT procedure.

At 315, the UE 115-*b* may receive/measure a signal based on determining which parameters will be used to select the RACH procedure. For example, if at 310, the UE 115-*b* determines that it will use a channel metric and threshold for selecting the RACH procedure, then at 315 the UE 115-*b* may measure a reference signal (e.g., SSB, CSI-RS). In some cases this may include calculating a specific channel metric (e.g., RSSI, RSRP, RSRQ, SNR, SINR, or the like) for the selected reference signal. In further examples, the UE 115-*b* may determine at 310 that a QoS parameter is to be used for selecting a RACH procedure. In this regard the signal could be a paging message indicating a priority level for data to be transmitted from the base station 105-*b* to the UE 115-*b*. In other cases, the UE 115-*b* may determine at 310 that the base station 105-*b* will indicate which RACH procedure to use. Thus, at 315 the signal received by the UE 115-*b* may include a paging message, PDDCH, MAC-CE, RRC signaling, or the like indicating which RACH procedure the UE should use. In some cases, the signal may be used to determine or estimate a TA. For example, the UE 115-*b* may monitor a channel metric (e.g., RSRP) of an SSB and based on a line of sight (LOS) channel to estimate a round trip time (RTT) or TA.

At 320, the UE 115-*b* may select a RACH procedure for establishing a connection with the base station 105-*b*. For example, in cases where the UE 115-*b* measured a channel metric, the UE 115-*b* may compare that channel metric to the threshold indicated in the configuration message. In some cases, this may include selecting a first RACH procedure (e.g., a two-step RACH) if the channel metric satisfies a threshold and selecting a second RACH procedure (e.g., four-step RACH) if the configuration message fails to satisfy the threshold. In some examples, the UE 115-*b* may select a RACH procedure based on a priority level associated with a QoS parameter. For example, the UE 115-*b* may select a two-step RACH for priority levels above a certain threshold (e.g., higher priority transmissions) and a four-step RACH for priority levels that are below that threshold. In examples where the configuration message (at 305) or signal (at 315) indicate a RACH procedure, the UE 115-*b* may select the RACH procedure indicated by those messages.

At 325, the UE 115-*b* and base station 105-*b* may perform the selected RACH procedure. For example, if at 320 the UE 115-*b* selects a two-step RACH procedure, then at 325, the UE 115-*b* and base station 105-*b* may exchange RACH messages (e.g., message A and message B) according to the two-step RACH procedure. In some cases, the message A may include data or a status indicator (e.g., BSR). In cases where the UE 115-*b* selects a four-step RACH procedure at 320, then at 325, the UE 115-*b* and the base station 105-*b* may exchange RACH messages (e.g., messages 1-4) according to the four-step RACH procedure.

At 330, the UE 115-*b* and base station 105-*b* may establish a communication connection based on the UE 115-*b* sending the initial RACH message at 325.

Figure 4:
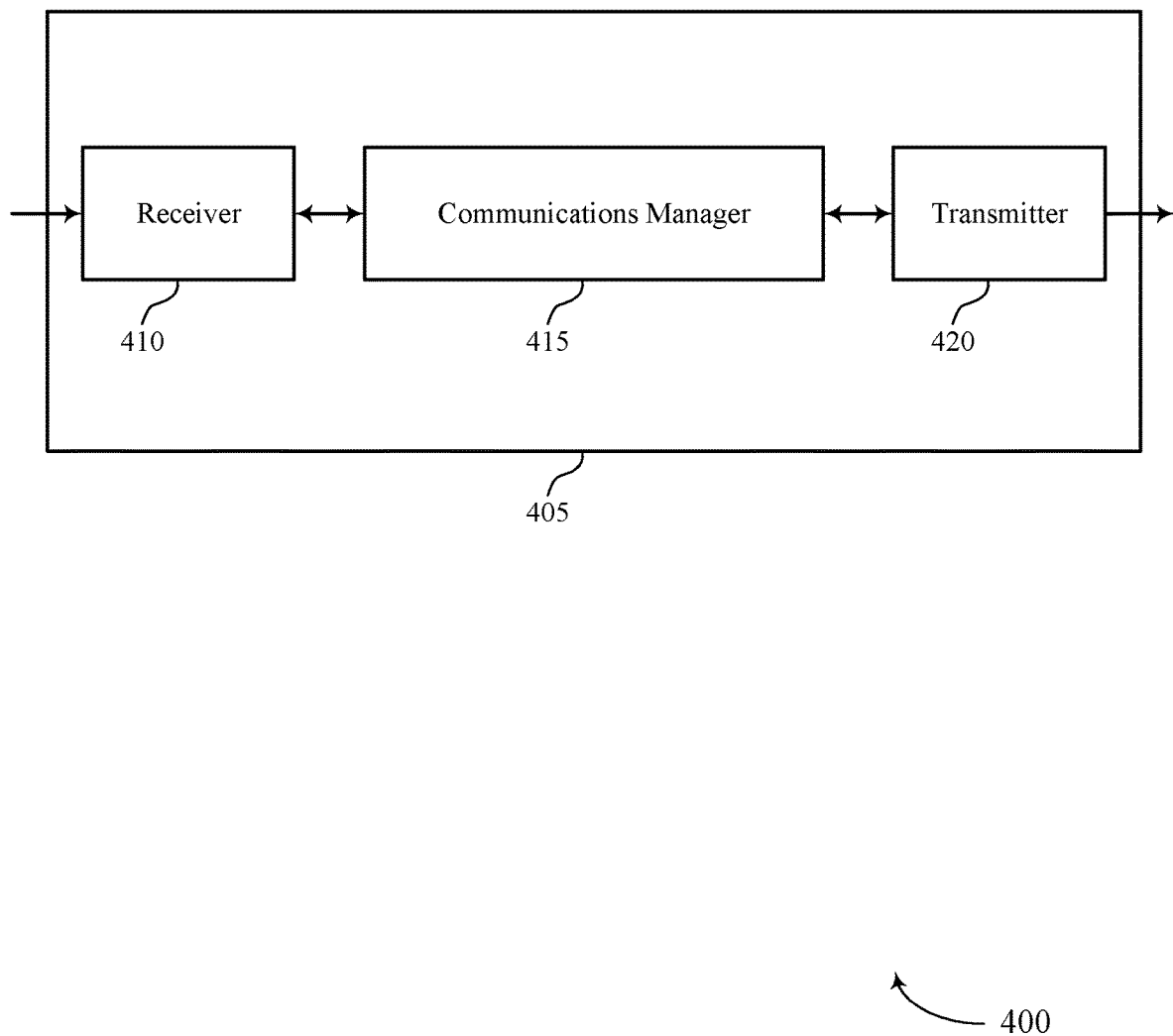
FIGS. 4 and 5 show block diagrams of devices that support techniques for configuring random access transmissions in accordance with aspects of the present disclosure.

FIG. 4 shows a block diagram 400 of a device 405 that supports techniques for configuring random access transmissions in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to techniques for configuring random access transmissions, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may receive a random access configuration message over a wireless channel, the random access configuration message indicating a channel metric and a threshold, determine the channel metric based on receiving the random access configuration message, select a first random access procedure from a set of random access procedures based on the channel metric and the threshold indicated in the random access configuration message, and establish a connection with a base station by performing the first random access procedure. The communications manager 415 may also determine a quality of service parameter associated with a data flow between the UE and a base station, identify a priority level associated with the data flow based on the quality of service parameter, select a first random access procedure from a set of random access procedures based on the identified priority level, and establish a connection with the base station by performing the first random access procedure. The communications manager 415 may also receive a control message from a base station, the control message indicating a first random access procedure from a set of random access procedures to be used for configuring a random access message and establish a connection with the base station by performing the first random access procedure. The communications manager 415 may also identify a message to be transmitted by the UE, determine a payload size associated with the message, select a first random access procedure from a set of random access procedures based on determining the payload size, and establish a connection with the base station by performing the first random access procedure. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the UE communications manager 415 as described herein may be implemented to realize one or more potential advantages. One implementation may allow a UE 115 to save power and increase battery life by avoiding having to perform multiple RACH procedures if an initial RACH procedure proves to be ill-suited to initiate communications. Another implementation may provide improved quality and reliability of service at the UE 115, as latency at the UE 115 may be reduced.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
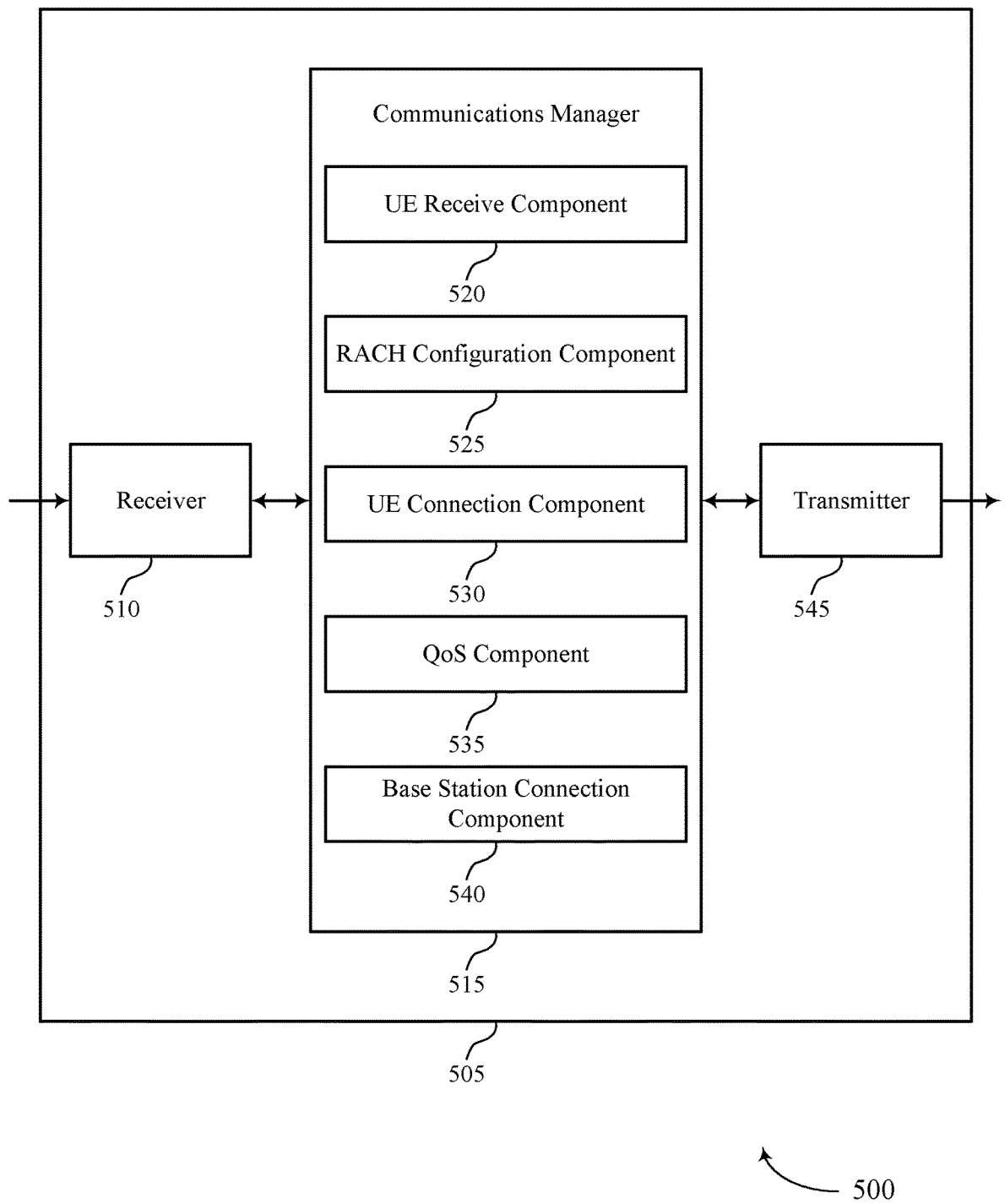

FIG. 5 shows a block diagram 500 of a device 505 that supports techniques for configuring random access transmissions in accordance with aspects of the present disclosure. The device 505 may be an example of aspects of a device 405, or a UE 115 as described herein. The device 505 may include a receiver 510, a communications manager 515, and a transmitter 545. The device 505 may also include a processor. Each of these components may be in communication with one another (e.g., via one or more buses).

The receiver 510 may receive information such as packets, user data, or control information associated with various information channels (e.g., control channels, data channels, and information related to techniques for configuring random access transmissions, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a UE receive component 520, a RACH configuration component 525, a UE connection component 530, a QoS component 535, and a base station connection component 540. The communications manager 515 may be an example of aspects of the communications manager 710 described herein.

The UE receive component 520 may receive a random access configuration message over a wireless channel, the random access configuration message indicating a channel metric and a threshold. The UE receive component 520 may receive a control message from a base station, the control message indicating a first random access procedure from a set of random access procedures to be used for configuring a random access message. The UE receive component 520 may identify a message to be transmitted by the UE.

The RACH configuration component 525 may determine the channel metric based on receiving the random access configuration message and select a first random access procedure from a set of random access procedures based on the channel metric and the threshold indicated in the random access configuration message. The RACH configuration component 525 may select a first random access procedure from a set of random access procedures based on the identified priority level. The RACH configuration component 525 may determine a payload size associated with the message and select a first random access procedure from a set of random access procedures based on determining the payload size.

The UE connection component 530 may establish a connection with a base station by performing the first random access procedure. The QoS component 535 may determine a quality of service parameter associated with a data flow between the UE and a base station and identify a priority level associated with the data flow based on the quality of service parameter. The base station connection component 540 may establish a connection with the base station by performing the first random access procedure.

The transmitter 545 may transmit signals generated by other components of the device 505. In some examples, the transmitter 545 may be collocated with a receiver 510 in a transceiver module. For example, the transmitter 545 may be an example of aspects of the transceiver 720 described with reference to FIG. 7. The transmitter 545 may utilize a single antenna or a set of antennas.

Figure 6:
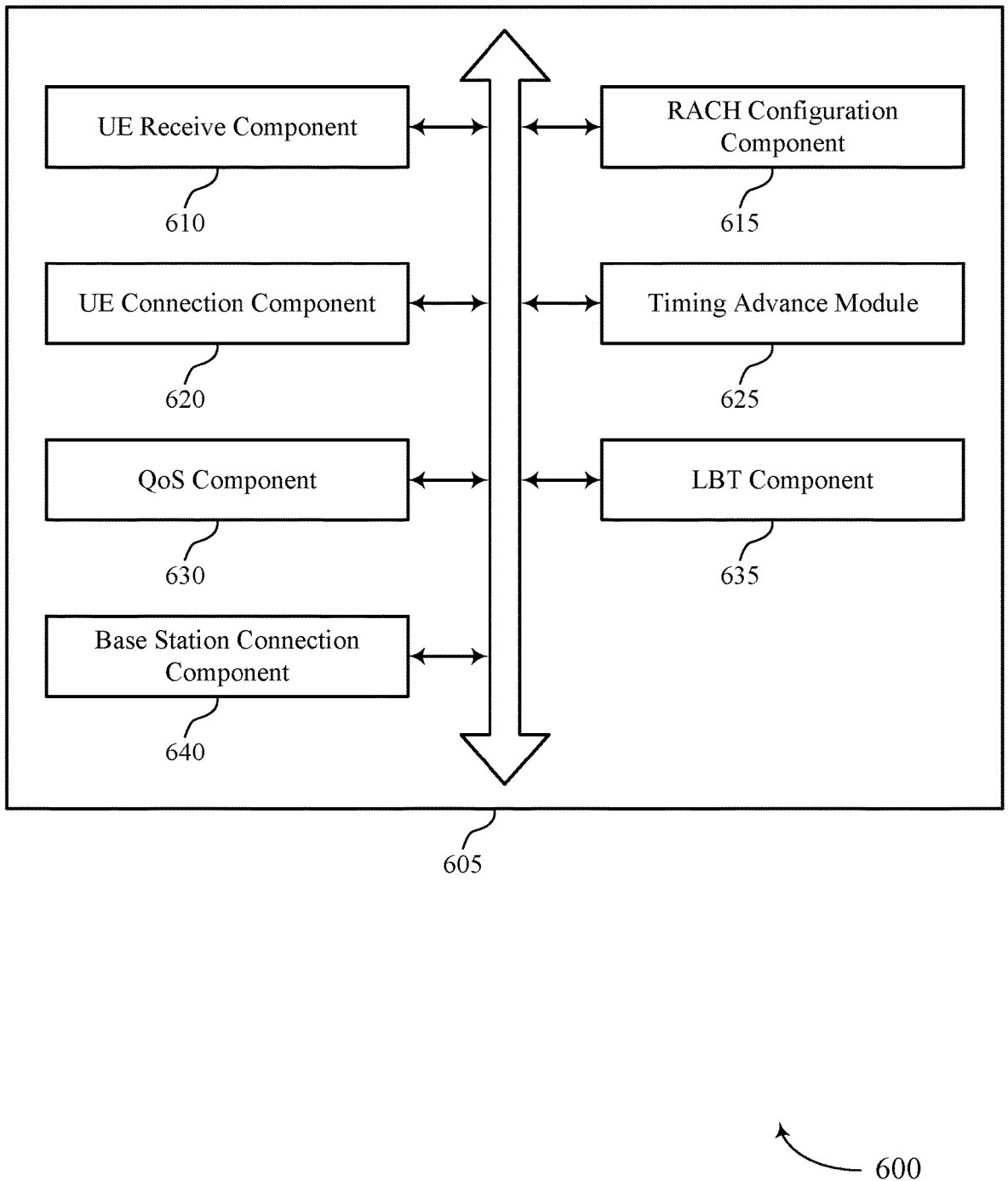
FIG. 6 shows a block diagram of a communications manager that supports techniques for configuring random access transmissions in accordance with aspects of the present disclosure.

FIG. 6 shows a block diagram 600 of a communications manager 605 that supports techniques for configuring random access transmissions in accordance with aspects of the present disclosure. The communications manager 605 may be an example of aspects of a communications manager 415, a communications manager 515, or a communications manager 710 described herein. The communications manager 605 may include a UE receive component 610, a RACH configuration component 615, a UE connection component 620, a timing advance module 625, a QoS component 630, a LBT component 635, and a base station connection component 640. Each of these modules may communicate, directly or indirectly, with one another (e.g., via one or more buses).

The UE receive component 610 may receive a random access configuration message over a wireless channel, the random access configuration message indicating a channel metric and a threshold. In some examples, the UE receive component 610 may receive a control message from a base station, the control message indicating a first random access procedure from a set of random access procedures to be used for configuring a random access message. In some examples, the UE receive component 610 may identify a message to be transmitted by the UE. In some examples, the UE receive component 610 may receive a random access capability received from the base station. In some examples, receiving a paging message received from the base station, where the paging message includes an indication of the quality of service parameter. In some examples, the UE receive component 610 may receive a random access configuration message over a wireless channel, the random access configuration message indicating a payload threshold.

In some cases, the random access capability is received in a master information block (MIB) signal and the cell reselection priority is based on the random access capability indicating a two-step random access procedure. In some cases, a paging message, PDCCH message, MAC control element, or RRC signaling.

The RACH configuration component 615 may determine the channel metric based on receiving the random access configuration message. In some examples, the RACH configuration component 615 may select a first random access procedure from a set of random access procedures based on the channel metric and the threshold indicated in the random access configuration message. In some examples, the RACH configuration component 615 may select a first random access procedure from a set of random access procedures based on the identified priority level. In some examples, the RACH configuration component 615 may determine a payload size associated with the message. In some examples, the RACH configuration component 615 may select a first random access procedure from a set of random access procedures based on determining the payload size.

In some examples, identifying a reference signal based on the random access configuration message, where determining the channel metric includes receiving a measurement of the reference signal.

In some examples, the RACH configuration component 615 may select between a two-step random access procedure and a four-step random access procedure based on the comparing the channel metric to the threshold. In some examples, the RACH configuration component 615 may select the two-step random access procedure if the channel metric satisfies the threshold. In some examples, the RACH configuration component 615 may select the four-step random access procedure if the channel metric fails to satisfy the threshold. In some examples, the RACH configuration component 615 may select a four-step random access procedure as the first random access procedure based on a failure to determine a timing advance from the random access configuration message. In some examples, the RACH configuration component 615 may determine a cell reselection priority based on the random access capability. In some examples, the RACH configuration component 615 may select a two-step random access procedure for the first random access procedure based on the priority level. In some examples, the RACH configuration component 615 may configure a random access message for transmission via the two-step random access procedure.

In some examples, selecting the first random access procedure based on a connection procedure, where the connection procedure includes one or more of: a beam failure recovery, handover completion, system information (SI) request, radio resource connection (RRC) establishment, or RRC resume.

In some examples, the RACH configuration component 615 may select between a two-step random access procedure and a four-step random access procedure based on the comparing the payload size to the payload threshold. In some examples, the RACH configuration component 615 may select the two-step random access procedure if the payload size satisfies the threshold. In some examples, the RACH configuration component 615 may select the four-step random access procedure if the payload size fails to satisfy the threshold.

In some cases, a synchronization signal block (SSB) or channel state information reference signal (CSI-RS). In some cases, a received signal strength indicator (RSSI), reference signal received power (RSRP), reference signal received quality (RSRQ), a SNR, or a signal-to-interference-plus-noise ratio (SINR). In some cases, a buffer status report (BSR) or message data.

The UE connection component 620 may establish a connection with a base station by performing the first random access procedure. In some examples, the UE connection component 620 may establish a connection with the base station by performing the first random access procedure. In some examples, the UE connection component 620 may establish a connection with the base station by performing the first random access procedure.

The QoS component 630 may determine a quality of service parameter associated with a data flow between the UE and a base station. In some examples, the QoS component 630 may identify a priority level associated with the data flow based on the quality of service parameter.

The base station connection component 640 may establish a connection with the base station by performing the first random access procedure.

The timing advance module 625 may receive a timing advance, where the random access configuration message includes the timing advance, and selecting the first random access procedure includes selecting a two-step random access procedure as the first random access procedure based on the timing advance. In some examples, the timing advance module 625 may identify a reference signal based on the random access configuration message, where the timing advance is estimated based on the reference signal.

In some cases, the random access configuration message includes an indication of the timing advance. In some cases, the random access configuration message is received during a connected mode and the timing advance is determined based on an uplink time.

The LBT component 635 may determine a listen-before-talk procedure associated with the first random access procedure. In some examples, the LBT component 635 may configure the LBT procedure based on the identified priority level associated with the data flow. In some examples, the LBT component 635 may identify a listen-before-talk procedure associated with the random access message indicated in the control message. In some examples, the LBT component 635 may configure an LBT operation to be performed prior to transmitting the random access message based on identifying the LBT procedure. In some cases, the LBT procedure is configured based on a priority associated with the first random access procedure.

Figure 7:
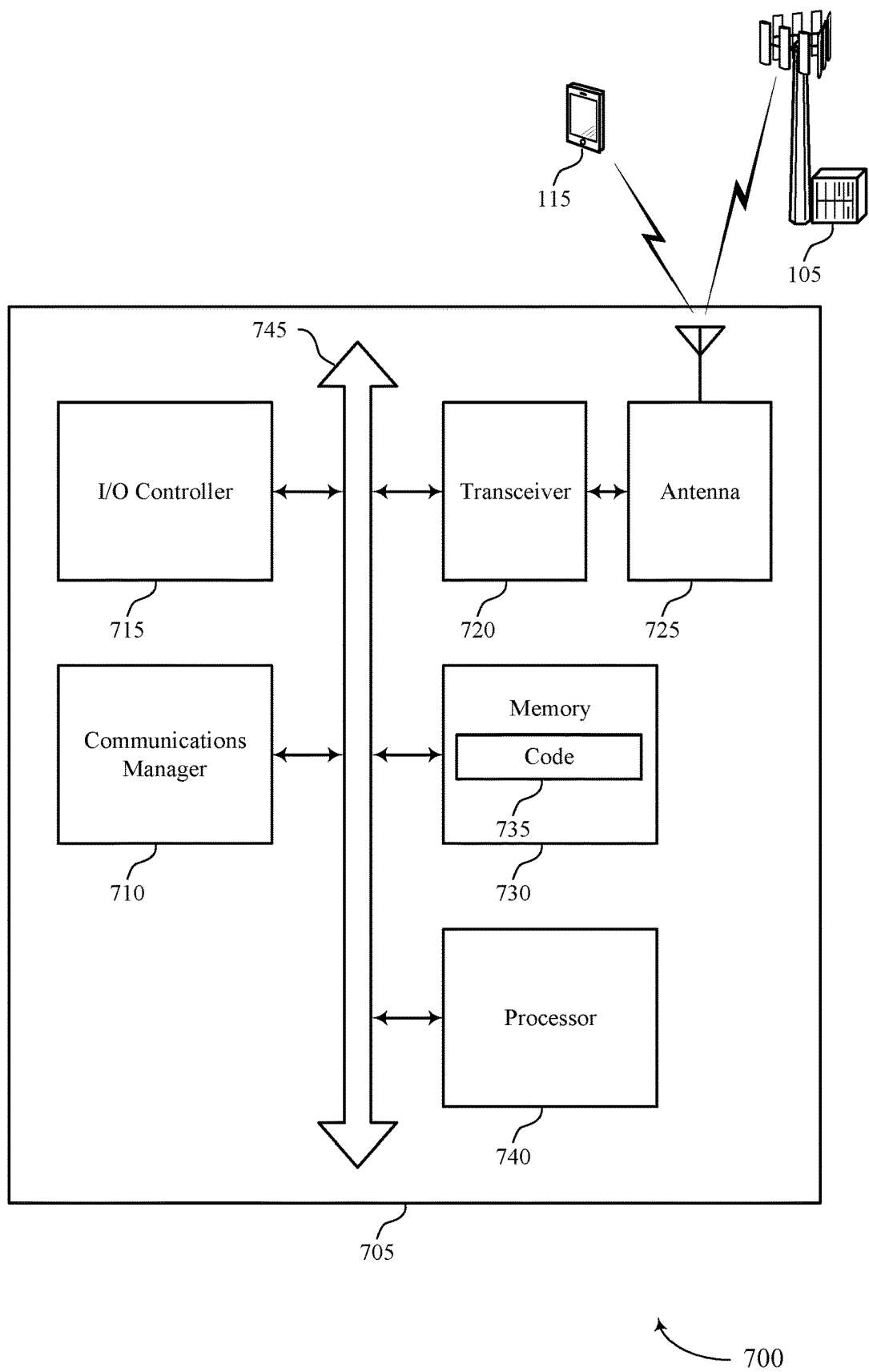
FIG. 7 shows a diagram of a system including a device that supports techniques for configuring random access transmissions in accordance with aspects of the present disclosure.

FIG. 7 shows a diagram of a system 700 including a device 705 that supports techniques for configuring random access transmissions in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may receive a random access configuration message over a wireless channel, the random access configuration message indicating a channel metric and a threshold, determine the channel metric based on receiving the random access configuration message, select a first random access procedure from a set of random access procedures based on the channel metric and the threshold indicated in the random access configuration message, and establish a connection with a base station by performing the first random access procedure. The communications manager 710 may also determine a quality of service parameter associated with a data flow between the UE and a base station, identify a priority level associated with the data flow based on the quality of service parameter, select a first random access procedure from a set of random access procedures based on the identified priority level, and establish a connection with the base station by performing the first random access procedure. The communications manager 710 may also receive a control message from a base station, the control message indicating a first random access procedure from a set of random access procedures to be used for configuring a random access message and establish a connection with the base station by performing the first random access procedure. The communications manager 710 may also identify a message to be transmitted by the UE, determine a payload size associated with the message, select a first random access procedure from a set of random access procedures based on determining the payload size, and establish a connection with the base station by performing the first random access procedure.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described herein. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include RAM and ROM. The memory 730 may store computer-readable, computer-executable code 735 including instructions that, when executed, cause the processor to perform various functions described herein. In some cases, the memory 730 may contain, among other things, a BIOS which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for configuring random access transmissions).

Based on improved techniques for configuring random access procedures, the processor 740 may efficiently determine an ideal RACH procedure to utilize for initiating communications. As such, the processor may be ready to respond more efficiently through the reduction of a ramp up in processing power.

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
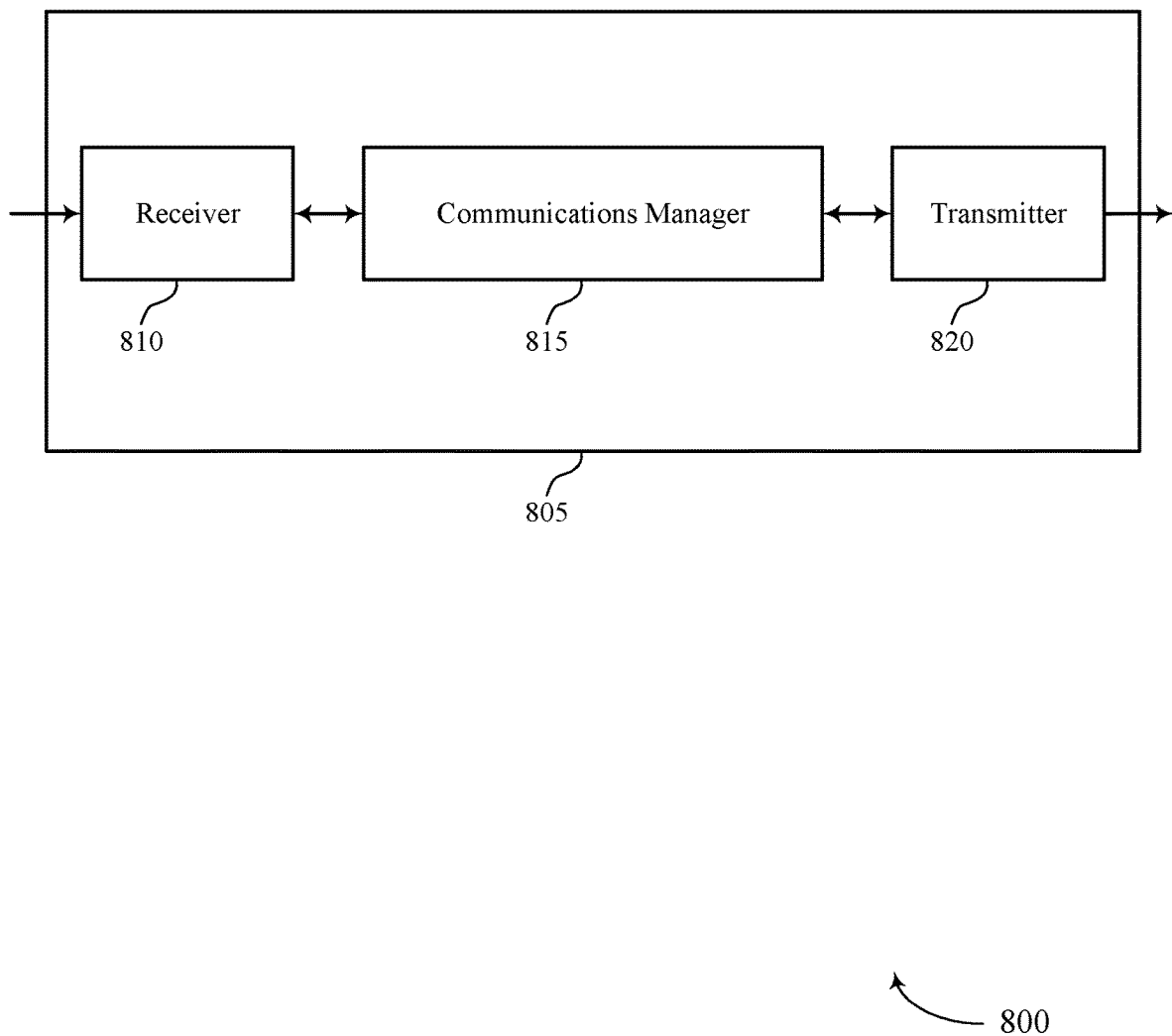
FIGS. 8 and 9 show block diagrams of devices that support techniques for configuring random access transmissions in accordance with aspects of the present disclosure.

FIG. 8 shows a block diagram 800 of a device 805 that supports techniques for configuring random access transmissions in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to techniques for configuring random access transmissions, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may transmit a random access configuration message over a wireless channel, the random access configuration message indicating a channel metric and threshold to be used for selecting a random access procedure, receive a random access message received according to a first random access procedure of a set of random access procedures, and establish a connection with a UE by performing the first random access procedure. The communications manager 815 may also transmit an indication of a quality of service parameter associated with a data flow between a UE and the base station, the quality of service parameter indicating a priority level associated with the data flow, identify a first random access procedure of a set of random access procedures based on the quality of service parameter, and establish a connection with the UE by performing the first random access procedure. The communications manager 815 may also transmit a control message to a UE, the control message indicating a first random access procedure from a set of random access procedures to be used for configuring a random access message and establish a connection with the UE by performing the first random access procedure. The communications manager 815 may also transmit an indication of a payload threshold associated with a data transmission between a UE and the base station, the payload threshold indicating a payload size associated with the data transmission, identify a first random access procedure of a set of random access procedures based on the payload size, and establish a connection with the UE by performing the first random access procedure. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
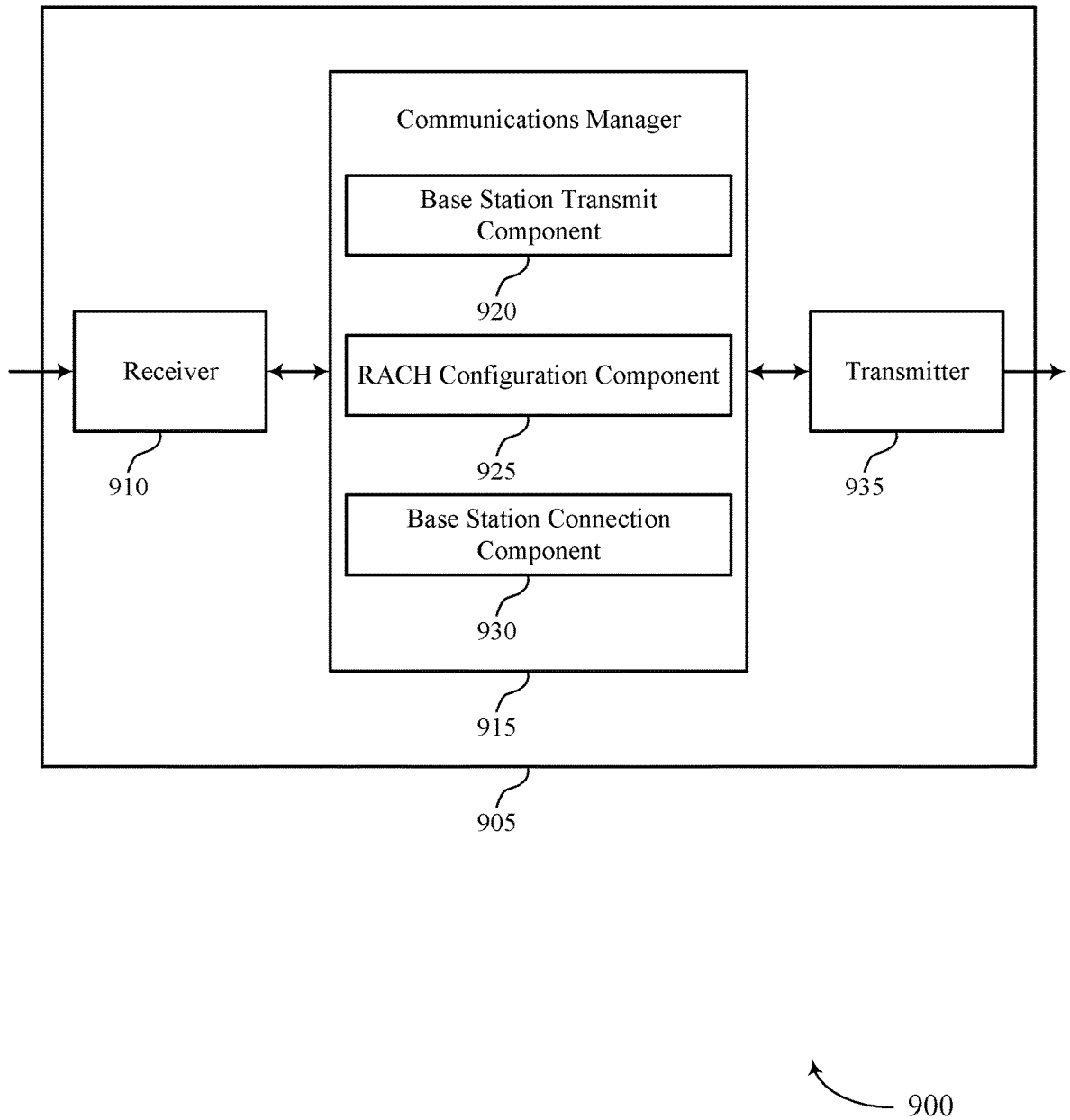

FIG. 9 shows a block diagram 900 of a device 905 that supports techniques for configuring random access transmissions in accordance with aspects of the present disclosure. The device 905 may be an example of aspects of a device 805, or a base station 105 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to techniques for configuring random access transmissions, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a base station transmit component 920, a RACH configuration component 925, and a base station connection component 930. The communications manager 915 may be an example of aspects of the communications manager 1110 described herein.

The base station transmit component 920 may transmit a random access configuration message over a wireless channel, the random access configuration message indicating a channel metric and threshold to be used for selecting a random access procedure.

The base station transmit component 920 may transmit an indication of a quality of service parameter associated with a data flow between a UE and the base station, the quality of service parameter indicating a priority level associated with the data flow. The base station transmit component 920 may transmit a control message to a UE, the control message indicating a first random access procedure from a set of random access procedures to be used for configuring a random access message. The base station transmit component 920 may transmit an indication of a payload threshold associated with a data transmission between a UE and the base station, the payload threshold indicating a payload size associated with the data transmission.

The RACH configuration component 925 may receive a random access message received according to a first random access procedure of a set of random access procedures. The RACH configuration component 925 may identify a first random access procedure of a set of random access procedures based on the quality of service parameter. The RACH configuration component 925 may identify a first random access procedure of a set of random access procedures based on the payload size.

The base station connection component 930 may establish a connection with a UE by performing the first random access procedure. The base station connection component 930 may establish a connection with the UE by performing the first random access procedure. The base station connection component 930 may establish a connection with the UE by performing the first random access procedure. The base station connection component 930 may establish a connection with the UE by performing the first random access procedure.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
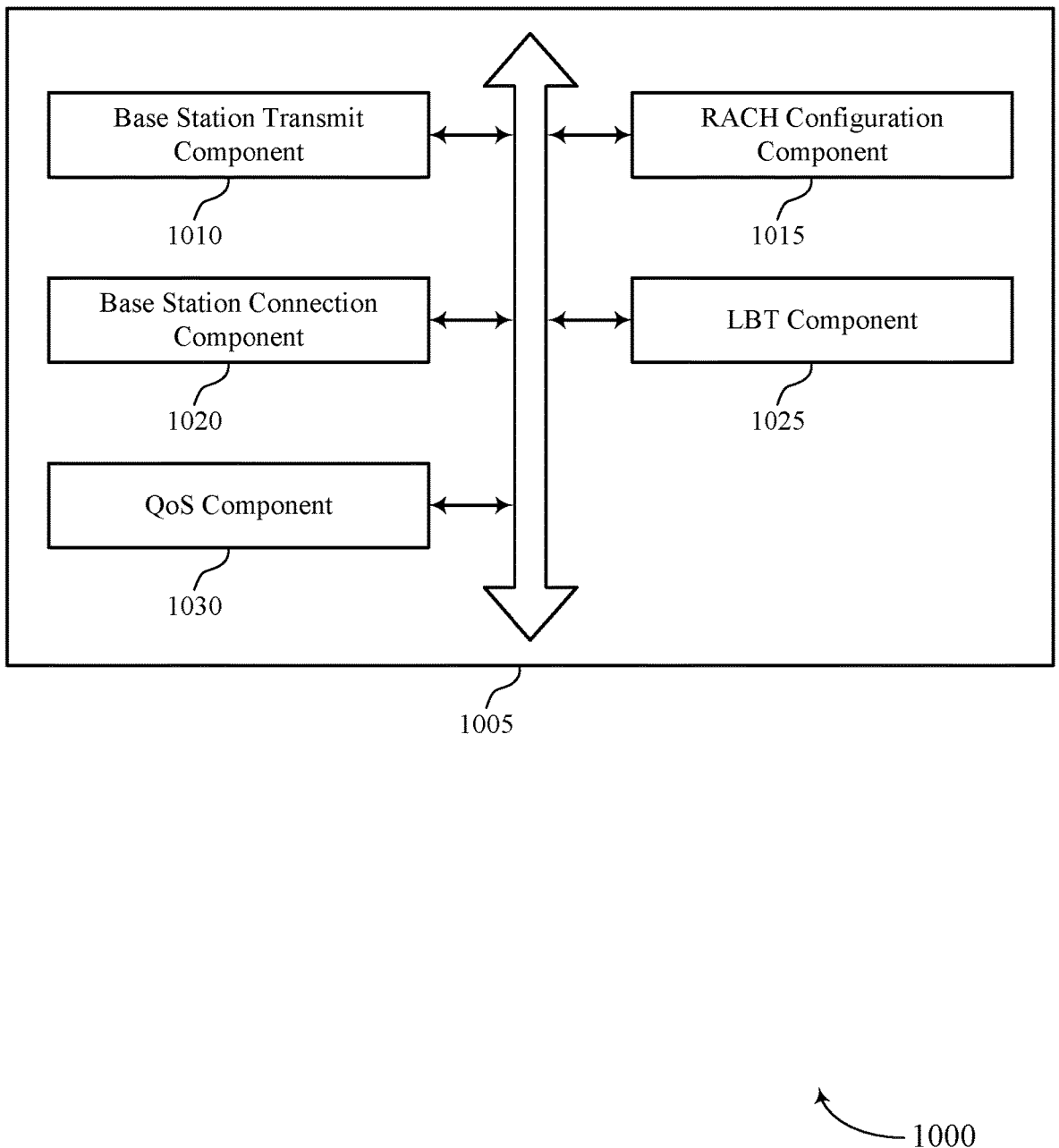
FIG. 10 shows a block diagram of a communications manager that supports techniques for configuring random access transmissions in accordance with aspects of the present disclosure.

FIG. 10 shows a block diagram 1000 of a communications manager 1005 that supports techniques for configuring random access transmissions in accordance with aspects of the present disclosure. The communications manager 1005 may be an example of aspects of a communications manager 815, a communications manager 915, or a communications manager 1110 described herein. The communications manager 1005 may include a base station transmit component 1010, a RACH configuration component 1015, a base station connection component 1020, a LBT component 1025, and a QoS component 1030. Each of these modules may communicate, directly or indirectly, with one another (e.g., via one or more buses).

The base station transmit component 1010 may transmit a random access configuration message over a wireless channel, the random access configuration message indicating a channel metric and threshold to be used for selecting a random access procedure. In some examples, the base station transmit component 1010 may transmit an indication of a quality of service parameter associated with a data flow between a UE and the base station, the quality of service parameter indicating a priority level associated with the data flow. In some examples, the base station transmit component 1010 may transmit a control message to a UE, the control message indicating a first random access procedure from a set of random access procedures to be used for configuring a random access message. In some examples, the base station transmit component 1010 may transmit an indication of a payload threshold associated with a data transmission between a UE and the base station, the payload threshold indicating a payload size associated with the data transmission. In some examples, the base station transmit component 1010 may transmit a random access capability in a first signal, the random access capability indicating one or more random access procedures supported by a base station.

In some cases, a master information block or a signal information block.

In some cases, the control message includes one or more of: a paging message, PDCCH message, MAC CE message, or RRC signaling.

The RACH configuration component 1015 may receive a random access message received according to a first random access procedure of a set of random access procedures. In some examples, the RACH configuration component 1015 may identify a first random access procedure of a set of random access procedures based on the quality of service parameter. In some examples, the RACH configuration component 1015 may identify a first random access procedure of a set of random access procedures based on the payload size. In some examples, the RACH configuration component 1015 may indicate, in the channel metric, a reference signal to be measured for selecting the random access procedure. In some examples, the RACH configuration component 1015 may indicate, in the random access configuration message, that the UE is to use a two-step random access procedure if the channel metric satisfies the threshold. In some examples, the RACH configuration component 1015 may indicate, in the random access configuration message, that the UE is to use a four-step random access procedure if the channel metric does not satisfy the threshold. In some examples, the RACH configuration component 1015 may indicate a two-step random access procedure for the first random access procedure based on the priority level. In some examples, the RACH configuration component 1015 may configure a random access response according to the two-step random access procedure.

In some cases, a synchronization signal block (SSB) or channel state information reference signal (CSI-RS). In some cases, a received signal strength indicator (RSSI), reference signal received power (RSRP), reference signal received quality (RSRQ), a signal-to-noise ratio (SNR), or signal-to-interference-plus-noise ratio (SINR). In some cases, the first random access procedure is a two-step random access procedure.

The base station connection component 1020 may establish a connection with a UE by performing the first random access procedure. In some examples, the base station connection component 1020 may establish a connection with the UE by performing the first random access procedure. In some examples, the base station connection component 1020 may establish a connection with the UE by performing the first random access procedure. In some examples, the base station connection component 1020 may establish a connection with the UE by performing the first random access procedure.

The LBT component 1025 may indicate, a listen-before-talk procedure associated with the random access message, where the LBT procedure is based on the quality of service parameter associated with the data flow. In some examples, the LBT component 1025 may indicate a listen-before-talk procedure to be performed in association with the first random access procedure, where the LBT procedure based on a priority associated with the first random access procedure.

The QoS component 1030 may transmit a paging message to the UE, the paging message including the quality of service parameter.

Figure 11:
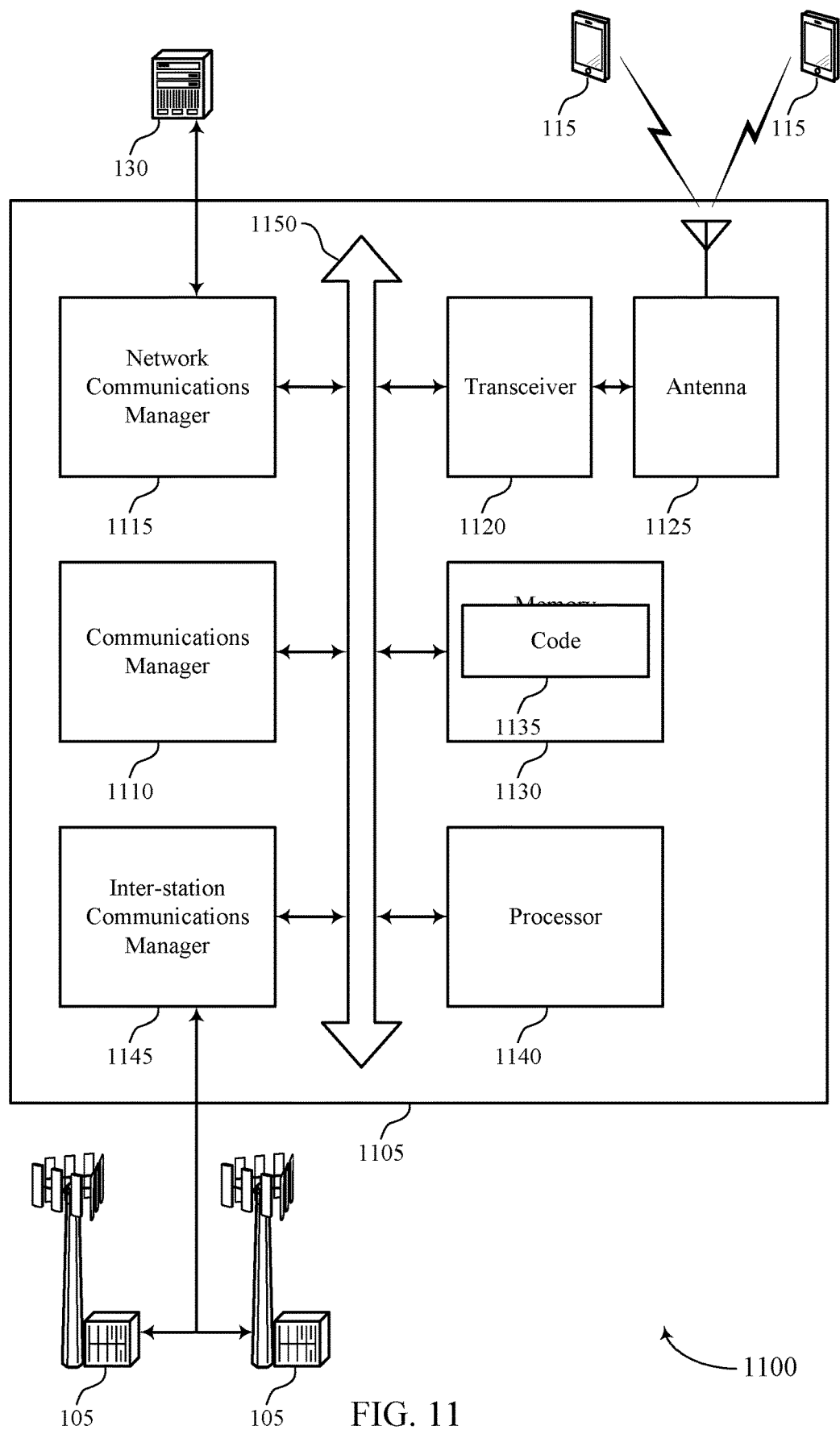
FIG. 11 shows a diagram of a system including a device that supports techniques for configuring random access transmissions in accordance with aspects of the present disclosure.

FIG. 11 shows a diagram of a system 1100 including a device 1105 that supports techniques for configuring random access transmissions in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may transmit a random access configuration message over a wireless channel, the random access configuration message indicating a channel metric and threshold to be used for selecting a random access procedure, receive a random access message received according to a first random access procedure of a set of random access procedures, and establish a connection with a UE by performing the first random access procedure. The communications manager 1110 may also transmit an indication of a quality of service parameter associated with a data flow between a UE and the base station, the quality of service parameter indicating a priority level associated with the data flow, identify a first random access procedure of a set of random access procedures based on the quality of service parameter, and establish a connection with the UE by performing the first random access procedure. The communications manager 1110 may also transmit a control message to a UE, the control message indicating a first random access procedure from a set of random access procedures to be used for configuring a random access message and establish a connection with the UE by performing the first random access procedure. The communications manager 1110 may also transmit an indication of a payload threshold associated with a data transmission between a UE and the base station, the payload threshold indicating a payload size associated with the data transmission, identify a first random access procedure of a set of random access procedures based on the payload size, and establish a connection with the UE by performing the first random access procedure.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting techniques for configuring random access transmissions).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
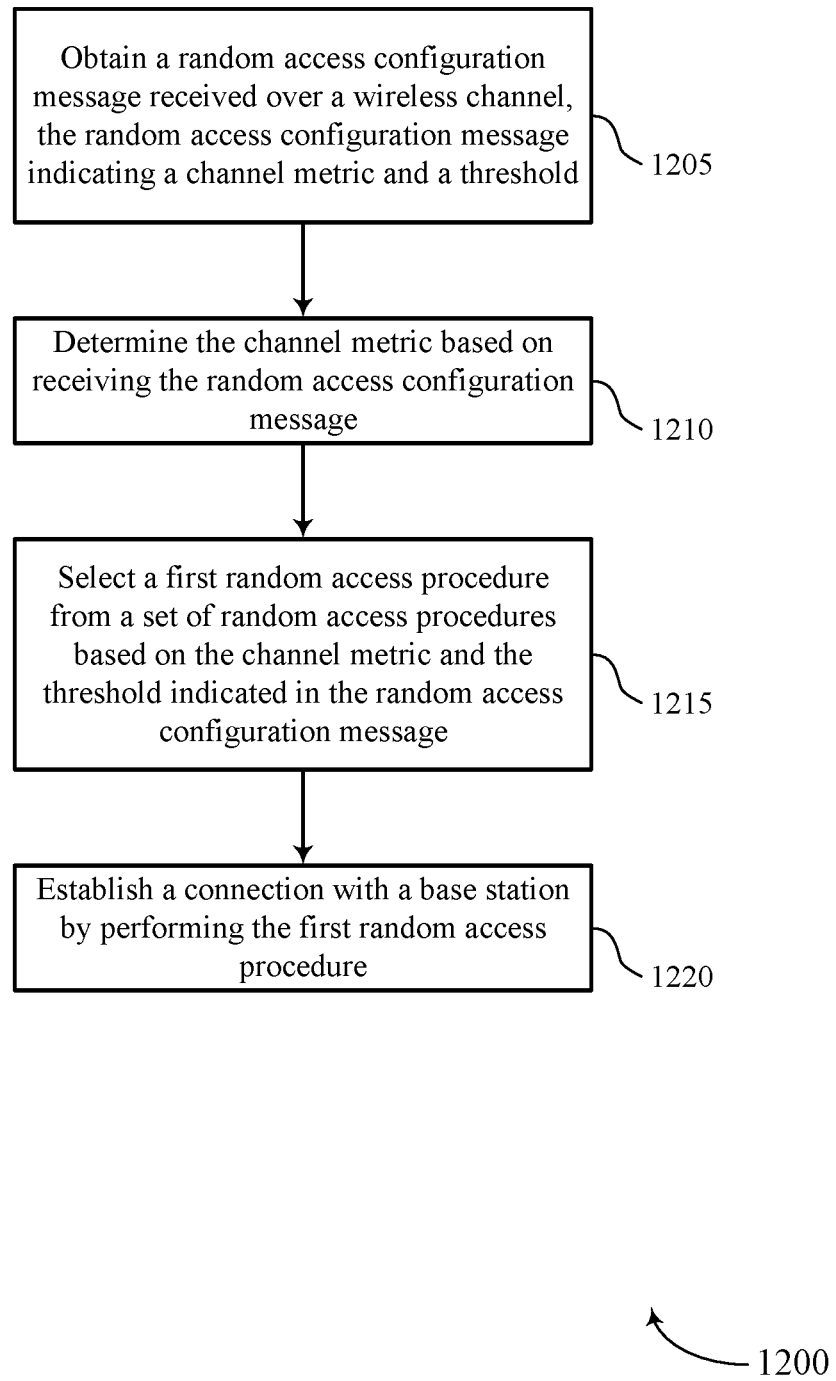
FIGS. 12 through 21 show flowcharts illustrating methods that support techniques for configuring random access transmissions in accordance with aspects of the present disclosure.

FIG. 12 shows a flowchart illustrating a method 1200 that supports techniques for configuring random access transmissions in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1205, the UE may receive a random access configuration message over a wireless channel, the random access configuration message indicating a channel metric and a threshold. The operations of 1205 may be performed according to the methods described herein. In some examples, aspects of the operations of 1205 may be performed by a UE receive component as described with reference to FIGS. 4 through 7.

At 1210, the UE may determine the channel metric based on receiving the random access configuration message. The operations of 1210 may be performed according to the methods described herein. In some examples, aspects of the operations of 1210 may be performed by a RACH configuration component as described with reference to FIGS. 4 through 7.

At 1215, the UE may select a first random access procedure from a set of random access procedures based on the channel metric and the threshold indicated in the random access configuration message. The operations of 1215 may be performed according to the methods described herein. In some examples, aspects of the operations of 1215 may be performed by a RACH configuration component as described with reference to FIGS. 4 through 7.

At 1220, the UE may establish a connection with a base station by performing the first random access procedure. The operations of 1220 may be performed according to the methods described herein. In some examples, aspects of the operations of 1220 may be performed by a UE connection component as described with reference to FIGS. 4 through 7.

Figure 13:
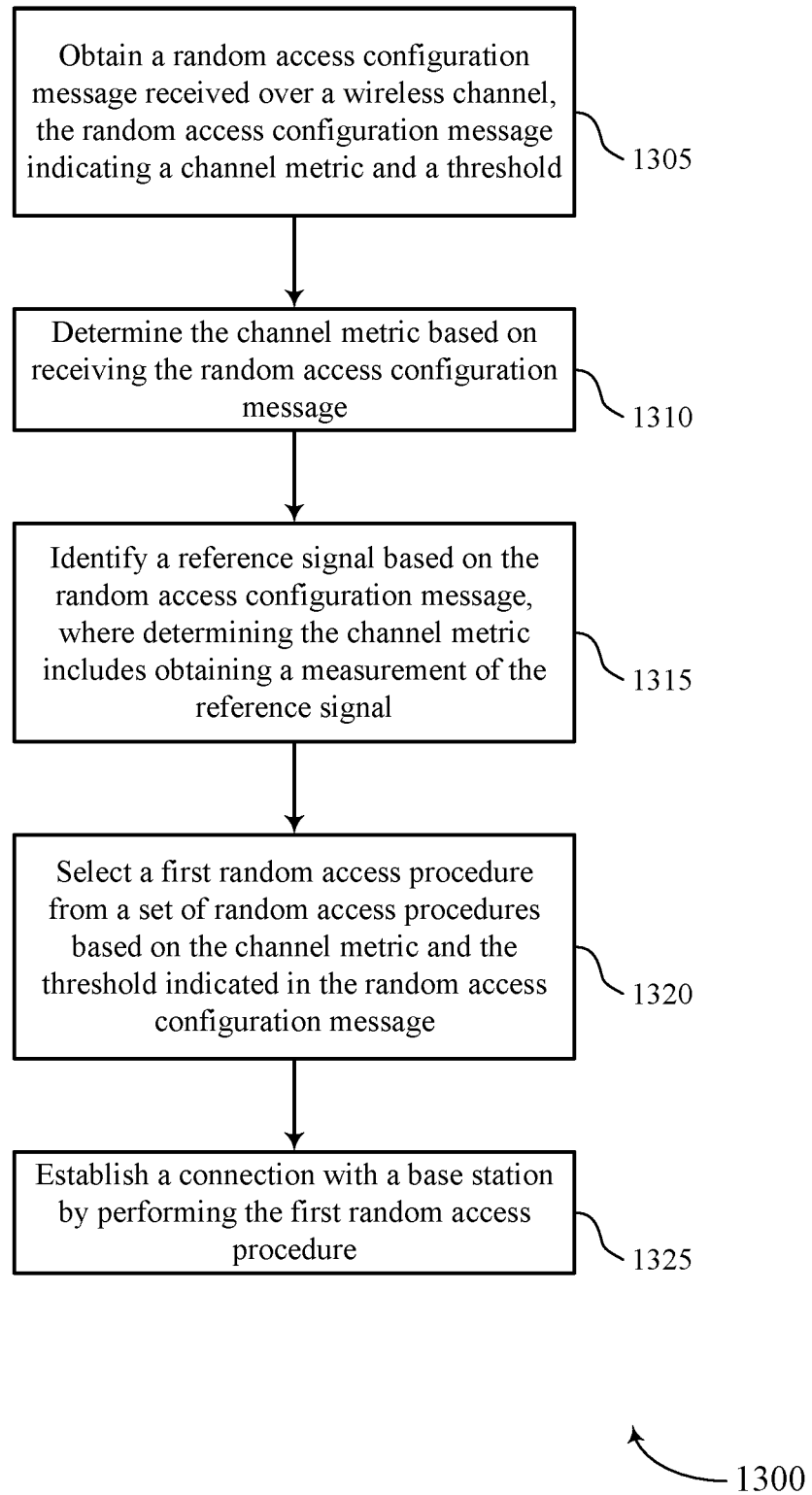

FIG. 13 shows a flowchart illustrating a method 1300 that supports techniques for configuring random access transmissions in accordance with aspects of the present disclosure. The operations of method 1300 may be implemented by a UE 115 or its components as described herein. For example, the operations of method 1300 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1305, the UE may receive a random access configuration message over a wireless channel, the random access configuration message indicating a channel metric and a threshold. The operations of 1305 may be performed according to the methods described herein. In some examples, aspects of the operations of 1305 may be performed by a UE receive component as described with reference to FIGS. 4 through 7.

At 1310, the UE may determine the channel metric based on receiving the random access configuration message. The operations of 1310 may be performed according to the methods described herein. In some examples, aspects of the operations of 1310 may be performed by a RACH configuration component as described with reference to FIGS. 4 through 7.

At 1315, the UE may identify a reference signal based on the random access configuration message, where determining the channel metric includes receiving a measurement of the reference signal. The operations of 1315 may be performed according to the methods described herein. In some examples, aspects of the operations of 1315 may be performed by a RACH configuration component as described with reference to FIGS. 4 through 7.

At 1320, the UE may select a first random access procedure from a set of random access procedures based on the channel metric and the threshold indicated in the random access configuration message. The operations of 1320 may be performed according to the methods described herein. In some examples, aspects of the operations of 1320 may be performed by a RACH configuration component as described with reference to FIGS. 4 through 7.

At 1325, the UE may establish a connection with a base station by performing the first random access procedure. The operations of 1325 may be performed according to the methods described herein. In some examples, aspects of the operations of 1325 may be performed by a UE connection component as described with reference to FIGS. 4 through 7.

Figure 14:
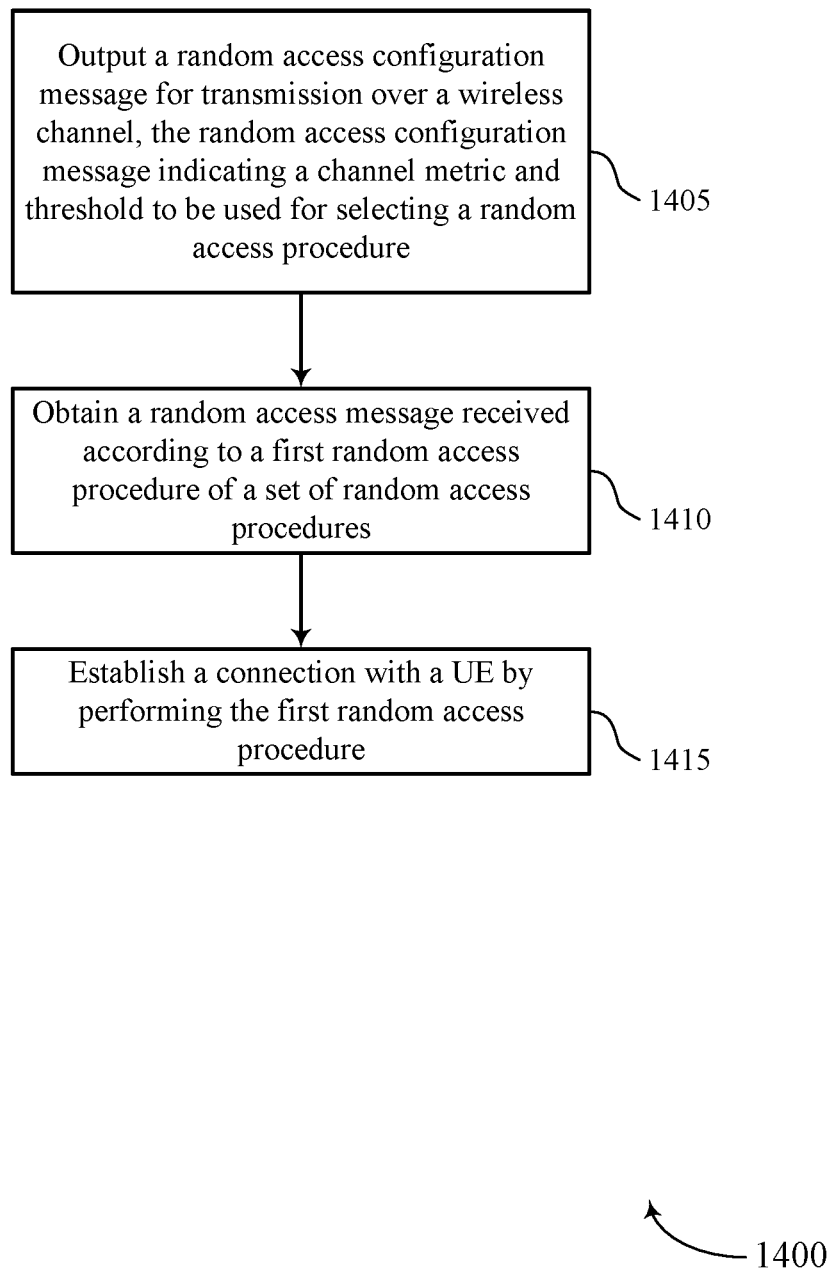

FIG. 14 shows a flowchart illustrating a method 1400 that supports techniques for configuring random access transmissions in accordance with aspects of the present disclosure. The operations of method 1400 may be implemented by a base station 105 or its components as described herein. For example, the operations of method 1400 may be performed by a communications manager as described with reference to FIGS. 8 through 11. In some examples, a base station may execute a set of instructions to control the functional elements of the base station to perform the functions described herein. Additionally or alternatively, a base station may perform aspects of the functions described herein using special-purpose hardware.

At 1405, the base station may transmit a random access configuration message over a wireless channel, the random access configuration message indicating a channel metric and threshold to be used for selecting a random access procedure. The operations of 1405 may be performed according to the methods described herein. In some examples, aspects of the operations of 1405 may be performed by a base station transmit component as described with reference to FIGS. 8 through 11.

At 1410, the base station may receive a random access message received according to a first random access procedure of a set of random access procedures. The operations of 1410 may be performed according to the methods described herein. In some examples, aspects of the operations of 1410 may be performed by a RACH configuration component as described with reference to FIGS. 8 through 11.

At 1415, the base station may establish a connection with a UE by performing the first random access procedure. The operations of 1415 may be performed according to the methods described herein. In some examples, aspects of the operations of 1415 may be performed by a base station connection component as described with reference to FIGS. 8 through 11.

Figure 15:
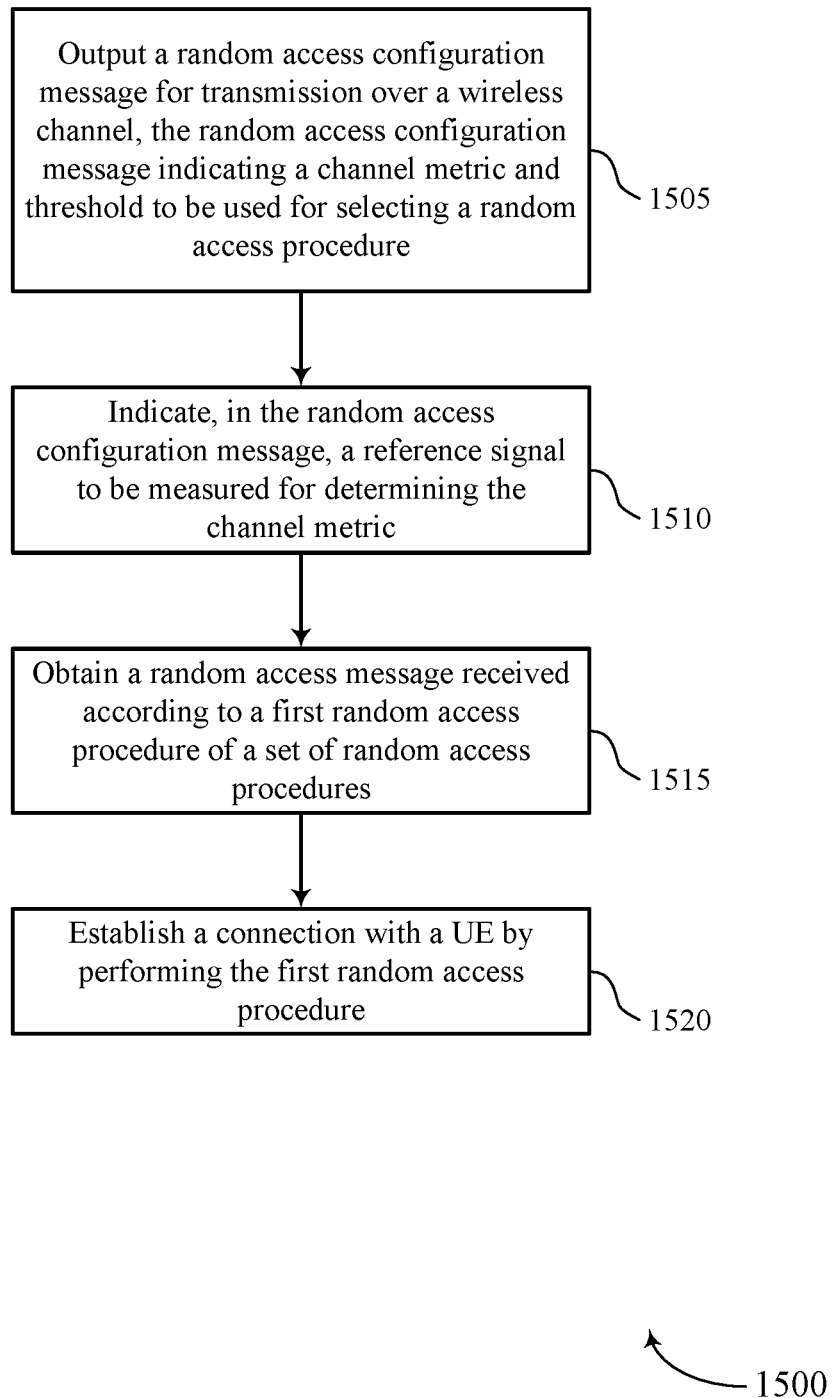

FIG. 15 shows a flowchart illustrating a method 1500 that supports techniques for configuring random access transmissions in accordance with aspects of the present disclosure. The operations of method 1500 may be implemented by a base station 105 or its components as described herein. For example, the operations of method 1500 may be performed by a communications manager as described with reference to FIGS. 8 through 11. In some examples, a base station may execute a set of instructions to control the functional elements of the base station to perform the functions described herein. Additionally or alternatively, a base station may perform aspects of the functions described herein using special-purpose hardware.

At 1505, the base station may transmit a random access configuration message over a wireless channel, the random access configuration message indicating a channel metric and threshold to be used for selecting a random access procedure. The operations of 1505 may be performed according to the methods described herein. In some examples, aspects of the operations of 1505 may be performed by a base station transmit component as described with reference to FIGS. 8 through 11.

At 1510, the base station may indicate, in the channel metric, a reference signal to be measured for selecting the random access procedure. The operations of 1510 may be performed according to the methods described herein. In some examples, aspects of the operations of 1510 may be performed by a RACH configuration component as described with reference to FIGS. 8 through 11.

At 1515, the base station may receive a random access message received according to a first random access procedure of a set of random access procedures. The operations of 1515 may be performed according to the methods described herein. In some examples, aspects of the operations of 1515 may be performed by a RACH configuration component as described with reference to FIGS. 8 through 11.

At 1520, the base station may establish a connection with a UE by performing the first random access procedure. The operations of 1520 may be performed according to the methods described herein. In some examples, aspects of the operations of 1520 may be performed by a base station connection component as described with reference to FIGS. 8 through 11.

Figure 16:
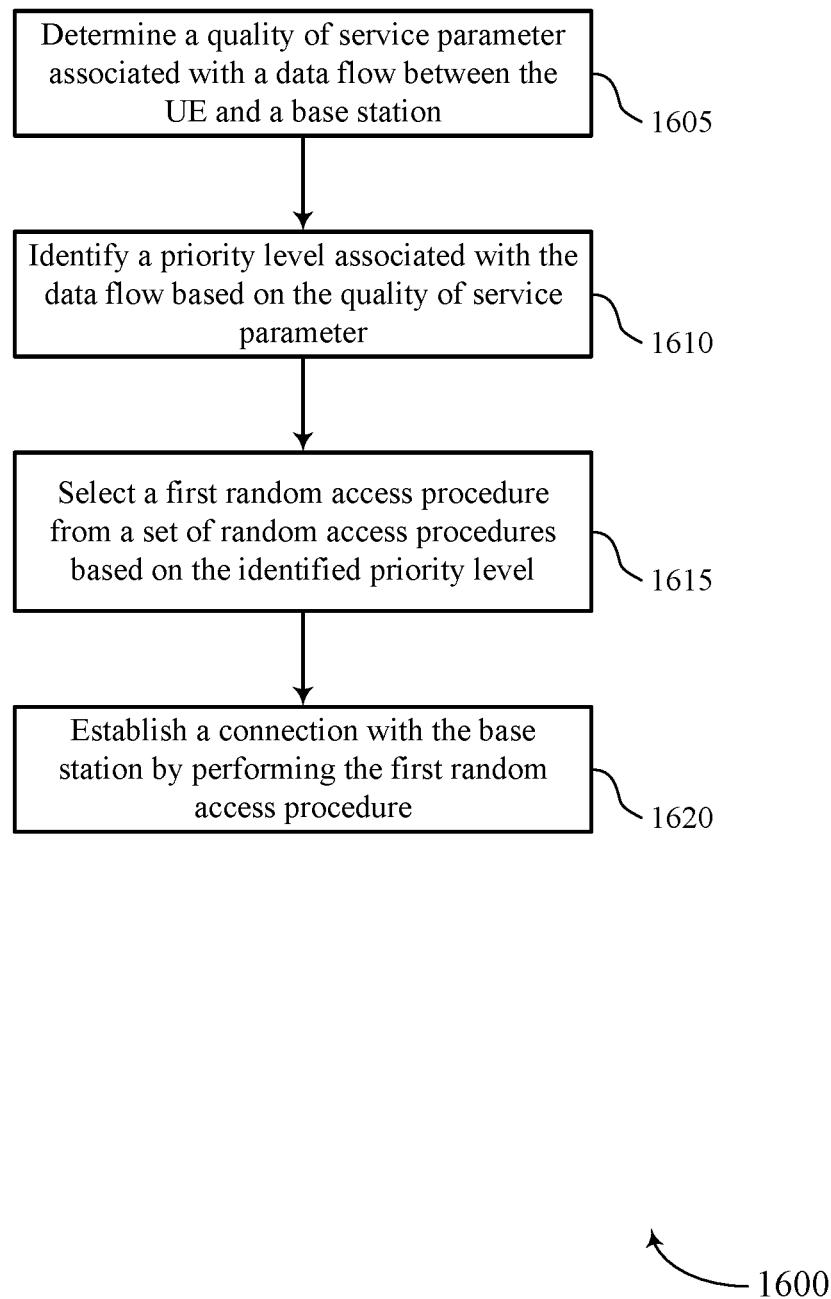

FIG. 16 shows a flowchart illustrating a method 1600 that supports techniques for configuring random access transmissions in accordance with aspects of the present disclosure. The operations of method 1600 may be implemented by a UE 115 or its components as described herein. For example, the operations of method 1600 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1605, the UE may determine a quality of service parameter associated with a data flow between the UE and a base station. The operations of 1605 may be performed according to the methods described herein. In some examples, aspects of the operations of 1605 may be performed by a QoS component as described with reference to FIGS. 4 through 7.

At 1610, the UE may identify a priority level associated with the data flow based on the quality of service parameter.

The operations of 1610 may be performed according to the methods described herein. In some examples, aspects of the operations of 1610 may be performed by a QoS component as described with reference to FIGS. 4 through 7.

At 1615, the UE may select a first random access procedure from a set of random access procedures based on the identified priority level. The operations of 1615 may be performed according to the methods described herein. In some examples, aspects of the operations of 1615 may be performed by a RACH configuration component as described with reference to FIGS. 4 through 7.

At 1620, the UE may establish a connection with the base station by performing the first random access procedure. The operations of 1620 may be performed according to the methods described herein. In some examples, aspects of the operations of 1620 may be performed by a UE connection component as described with reference to FIGS. 4 through 7.

Figure 17:
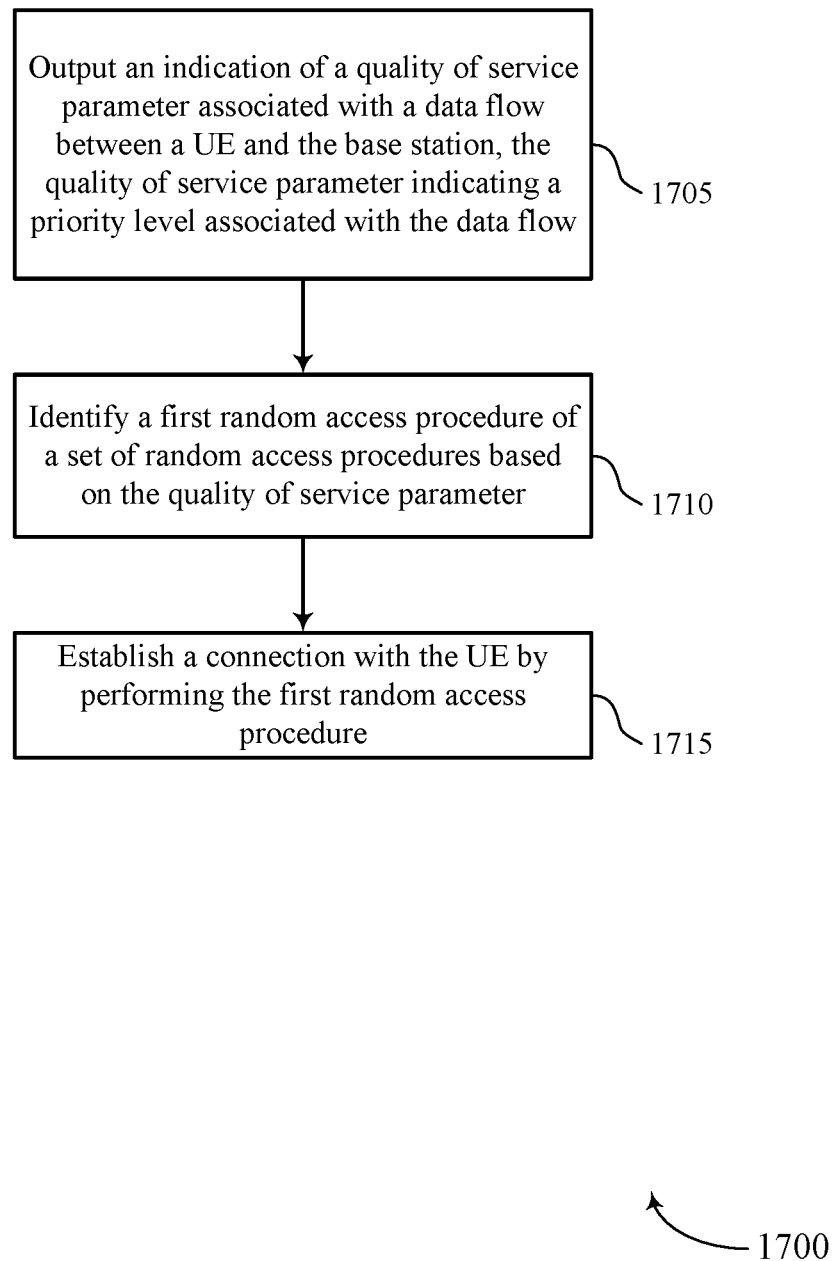

FIG. 17 shows a flowchart illustrating a method 1700 that supports techniques for configuring random access transmissions in accordance with aspects of the present disclosure. The operations of method 1700 may be implemented by a base station 105 or its components as described herein. For example, the operations of method 1700 may be performed by a communications manager as described with reference to FIGS. 8 through 11. In some examples, a base station may execute a set of instructions to control the functional elements of the base station to perform the functions described herein. Additionally or alternatively, a base station may perform aspects of the functions described herein using special-purpose hardware.

At 1705, the base station may transmit an indication of a quality of service parameter associated with a data flow between a UE and the base station, the quality of service parameter indicating a priority level associated with the data flow. The operations of 1705 may be performed according to the methods described herein. In some examples, aspects of the operations of 1705 may be performed by a base station transmit component as described with reference to FIGS. 8 through 11.

At 1710, the base station may identify a first random access procedure of a set of random access procedures based on the quality of service parameter. The operations of 1710 may be performed according to the methods described herein. In some examples, aspects of the operations of 1710 may be performed by a RACH configuration component as described with reference to FIGS. 8 through 11.

At 1715, the base station may establish a connection with the UE by performing the first random access procedure. The operations of 1715 may be performed according to the methods described herein. In some examples, aspects of the operations of 1715 may be performed by a base station connection component as described with reference to FIGS. 8 through 11.

Figure 18:
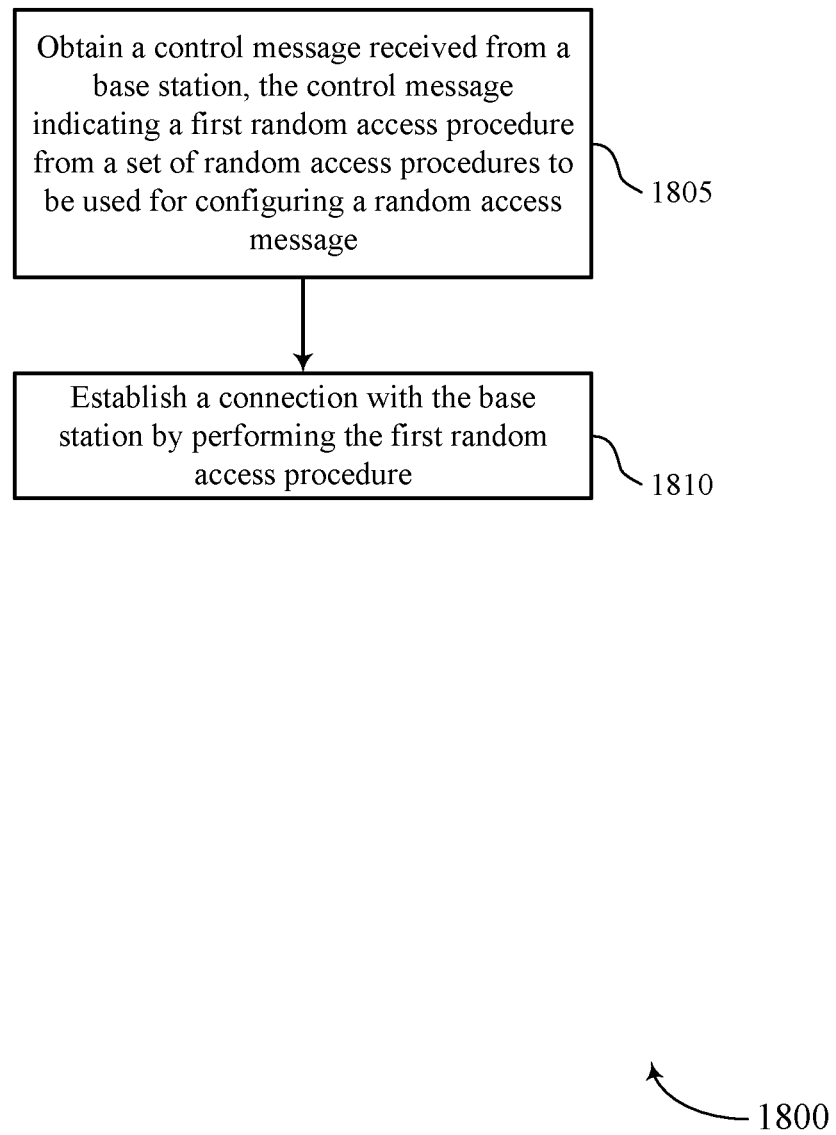

FIG. 18 shows a flowchart illustrating a method 1800 that supports techniques for configuring random access transmissions in accordance with aspects of the present disclosure. The operations of method 1800 may be implemented by a UE 115 or its components as described herein. For example, the operations of method 1800 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1805, the UE may receive a control message from a base station, the control message indicating a first random access procedure from a set of random access procedures to be used for configuring a random access message. The operations of 1805 may be performed according to the methods described herein. In some examples, aspects of the operations of 1805 may be performed by a UE receive component as described with reference to FIGS. 4 through 7.

At 1810, the UE may establish a connection with the base station by performing the first random access procedure. The operations of 1810 may be performed according to the methods described herein. In some examples, aspects of the operations of 1810 may be performed by a base station connection component as described with reference to FIGS. 4 through 7.

Figure 19:
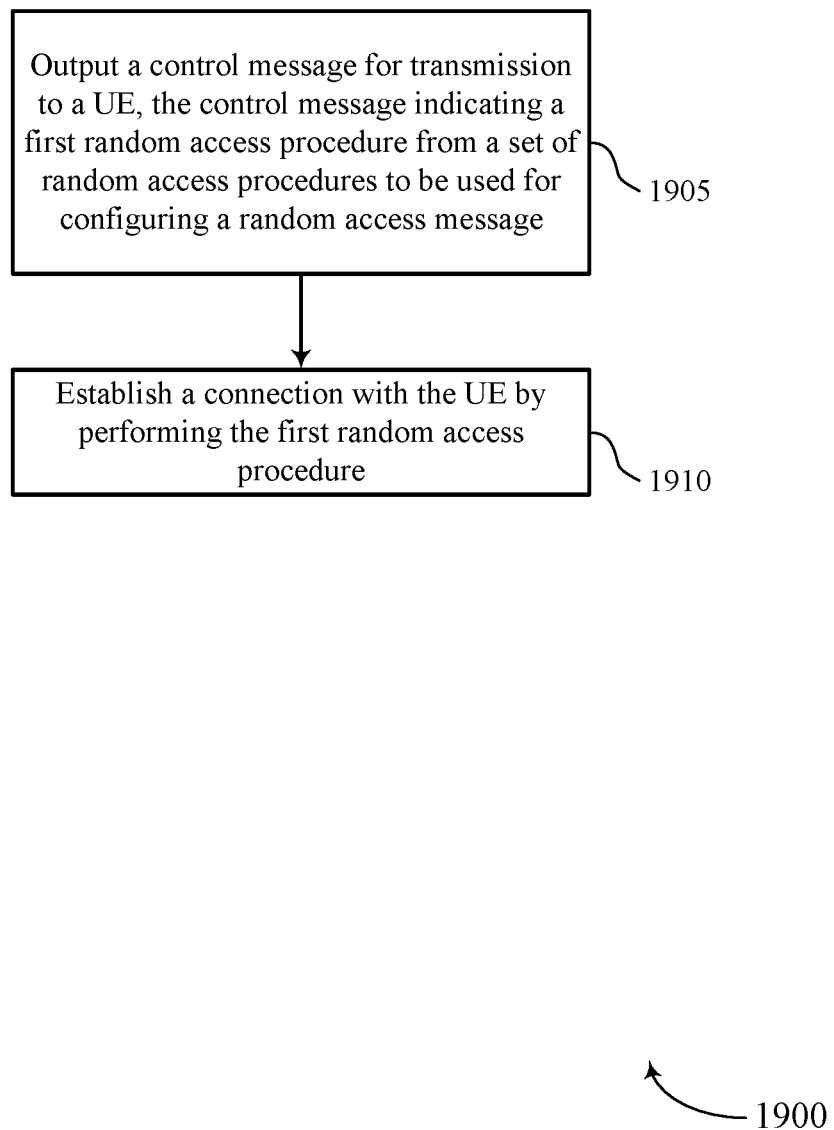

FIG. 19 shows a flowchart illustrating a method 1900 that supports techniques for configuring random access transmissions in accordance with aspects of the present disclosure. The operations of method 1900 may be implemented by a base station 105 or its components as described herein. For example, the operations of method 1900 may be performed by a communications manager as described with reference to FIGS. 8 through 11. In some examples, a base station may execute a set of instructions to control the functional elements of the base station to perform the functions described herein. Additionally or alternatively, a base station may perform aspects of the functions described herein using special-purpose hardware.

At 1905, the base station may transmit a control message to a UE, the control message indicating a first random access procedure from a set of random access procedures to be used for configuring a random access message. The operations of 1905 may be performed according to the methods described herein. In some examples, aspects of the operations of 1905 may be performed by a base station transmit component as described with reference to FIGS. 8 through 11.

At 1910, the base station may establish a connection with the UE by performing the first random access procedure. The operations of 1910 may be performed according to the methods described herein. In some examples, aspects of the operations of 1910 may be performed by a base station connection component as described with reference to FIGS. 8 through 11.

Figure 20:
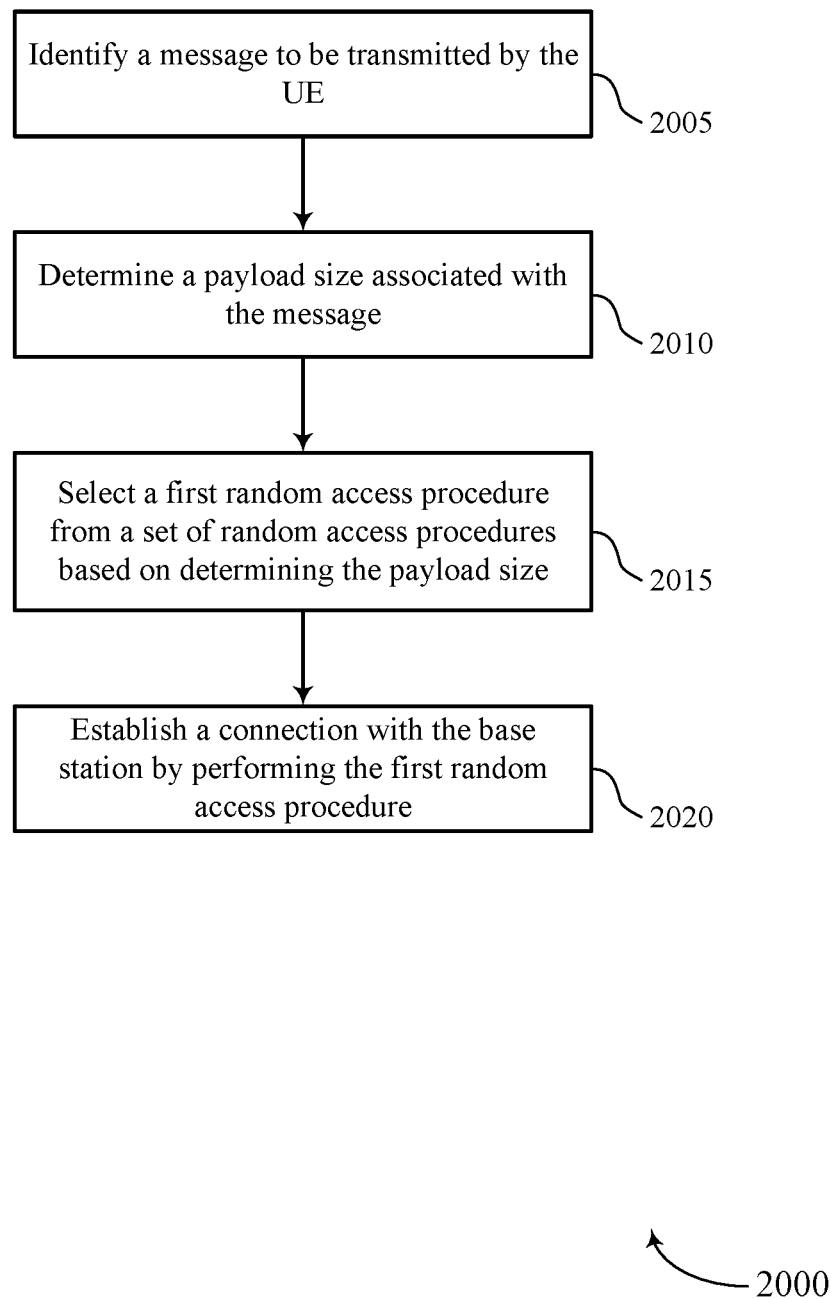

FIG. 20 shows a flowchart illustrating a method 2000 that supports techniques for configuring random access transmissions in accordance with aspects of the present disclosure. The operations of method 2000 may be implemented by a UE 115 or its components as described herein. For example, the operations of method 2000 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 2005, the UE may identify a message to be transmitted by the UE. The operations of 2005 may be performed according to the methods described herein. In some examples, aspects of the operations of 2005 may be performed by a UE receive component as described with reference to FIGS. 4 through 7.

At 2010, the UE may determine a payload size associated with the message. The operations of 2010 may be performed according to the methods described herein. In some examples, aspects of the operations of 2010 may be performed by a RACH configuration component as described with reference to FIGS. 4 through 7.

At 2015, the UE may select a first random access procedure from a set of random access procedures based on determining the payload size. The operations of 2015 may be performed according to the methods described herein. In some examples, aspects of the operations of 2015 may be performed by a RACH configuration component as described with reference to FIGS. 4 through 7.

At 2020, the UE may establish a connection with the base station by performing the first random access procedure. The operations of 2020 may be performed according to the methods described herein. In some examples, aspects of the operations of 2020 may be performed by a UE connection component as described with reference to FIGS. 4 through 7.

Figure 21:
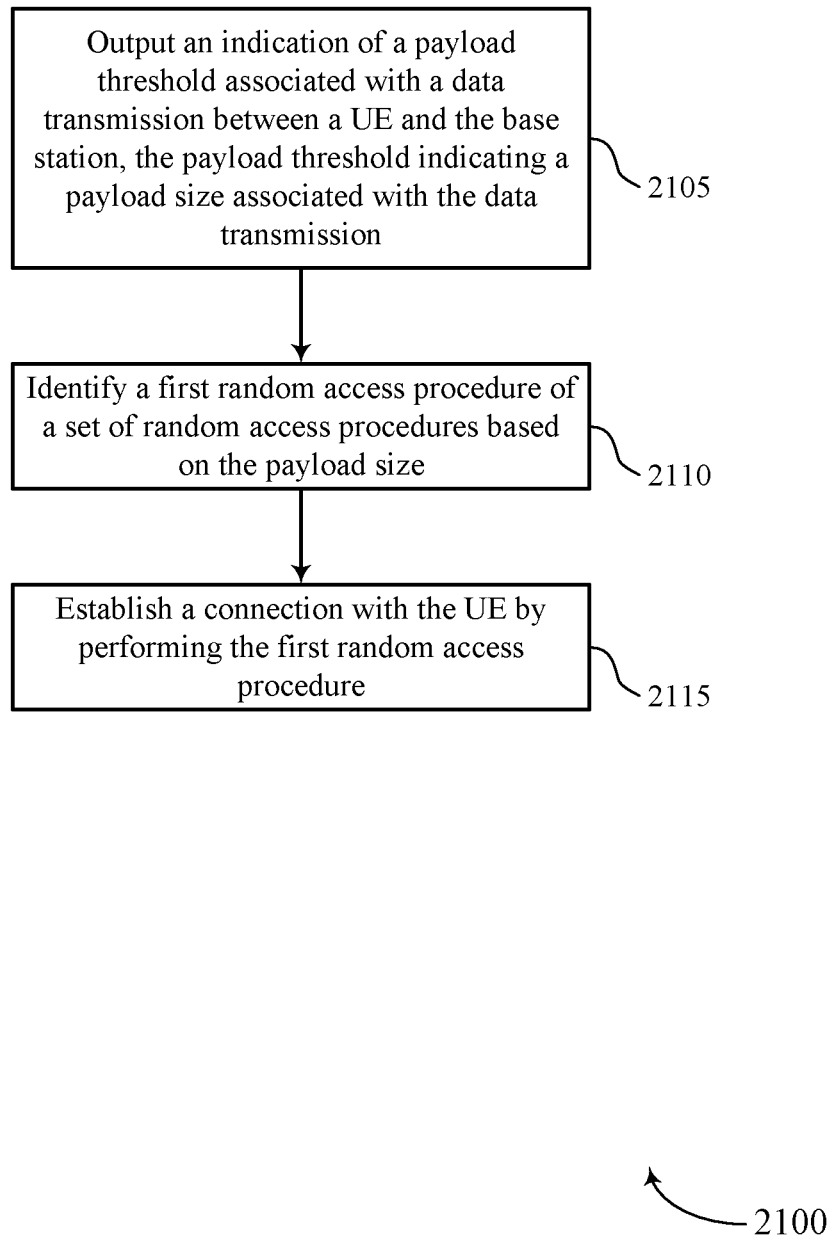

FIG. 21 shows a flowchart illustrating a method 2100 that supports techniques for configuring random access transmissions in accordance with aspects of the present disclosure. The operations of method 2100 may be implemented by a base station 105 or its components as described herein. For example, the operations of method 2100 may be performed by a communications manager as described with reference to FIGS. 8 through 11. In some examples, a base station may execute a set of instructions to control the functional elements of the base station to perform the functions described herein. Additionally or alternatively, a base station may perform aspects of the functions described herein using special-purpose hardware.

At 2105, the base station may transmit an indication of a payload threshold associated with a data transmission between a UE and the base station, the payload threshold indicating a payload size associated with the data transmission. The operations of 2105 may be performed according to the methods described herein. In some examples, aspects of the operations of 2105 may be performed by a base station transmit component as described with reference to FIGS. 8 through 11.

At 2110, the base station may identify a first random access procedure of a set of random access procedures based on the payload size. The operations of 2110 may be performed according to the methods described herein. In some examples, aspects of the operations of 2110 may be performed by a RACH configuration component as described with reference to FIGS. 8 through 11.

At 2115, the base station may establish a connection with the UE by performing the first random access procedure. The operations of 2115 may be performed according to the methods described herein. In some examples, aspects of the operations of 2115 may be performed by a base station connection component as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving a random access configuration message over a wireless channel, the random access configuration message indicating a channel metric and a threshold, wherein the random access configuration message comprises a timing advance;
   selecting a reference signal based at least in part on a received configuration message and based at least in part on at least one of the channel metric or the threshold;
   determining the channel metric based at least in part on receiving the random access configuration message, wherein determining the channel metric comprises receiving a measurement of the selected reference signal;
   selecting a first random access procedure from a plurality of random access procedures based at least in part on the channel metric and the threshold indicated in the random access configuration message, wherein selecting the first random access procedure comprises selecting a two-step random access procedure as the first random access procedure based at least in part on the timing advance; and
   establishing a connection with a network device by performing the first random access procedure.

2. The method of claim 1, wherein the reference signal comprises a synchronization signal block (SSB), and wherein the channel metric comprises a reference signal received power (RSRP).

3. The method of claim 1, wherein the reference signal comprises a channel state information reference signal (CSI-RS).

4. The method of claim 1, wherein the channel metric comprises one or more of: a received signal strength indicator (RSSI), reference signal received quality (RSRQ), a signal-to-noise ratio (SNR), or a signal-to-interference-plus-noise ratio (SINR).

5. The method of claim 1, wherein selecting the first random access procedure comprises:
selecting between a two-step random access procedure and a four-step random access procedure based at least in part on comparing the channel metric to the threshold.

6. The method of claim 5, further comprising:
selecting the two-step random access procedure if the channel metric satisfies the threshold.

7. The method of claim 5, further comprising:
selecting the four-step random access procedure if the channel metric fails to satisfy the threshold.

8. The method of claim 1, wherein the random access configuration message comprises an indication of the timing advance.

9. The method of claim 1, wherein the random access configuration message is received during a connected mode and the timing advance is determined based at least in part on an uplink time.

10. The method of claim 1, wherein identifying the reference signal comprises:
identifying the reference signal based at least in part on the random access configuration message, wherein the timing advance is estimated based at least in part on the reference signal.

11. The method of claim 1, further comprising:
receiving a random access capability received from the network device; and
determining a cell reselection priority based at least in part on the random access capability.

12. The method of claim 11, wherein the random access capability is received in a master information block (MIB) signal and the cell reselection priority is based at least in part on the random access capability indicating a two-step random access procedure.

13. The method of claim 1, wherein selecting the first random access procedure from the plurality of random access procedures is based at least in part on a quality of a service parameter, the quality of the service parameter indicative of a priority level associated with data transmission between the UE and the network device.

14. The method of claim 1, wherein selecting the first random access procedure from the plurality of random access procedures is based at least in part on a priority level associated with data to be transmitted from the network device to the UE.

15. The method of claim 1, wherein selecting the first random access procedure from the plurality of random access procedures is based at least in part on a type of control information to be transmitted between the UE and the network device.

16. The method of claim 1, further comprising:
performing a cell selection or reselection based at least in part on a priority level associated with the first random access procedure, the priority level based at least in part on receiving a random access capability associated with the network device.

17. A method for wireless communications at a user equipment (UE), comprising:
receiving a control message from a network device, the control message specifying for the UE to use a first random access procedure from a plurality of random access procedures to configure a random access message, the plurality of random access procedures comprising a two-step random access procedure and a four-step random access procedure;
identifying a listen before talk (LBT) procedure based at least in part on the first random access procedure specified in the control message and a procedure for which the first random access procedure is used, the procedure comprising a beam failure recovery, a handover completion, a system information, or a combination thereof;
configuring the LBT procedure to be performed prior to transmitting the random access message; and
establishing a connection with the network device by performing the first random access procedure.

18. The method of claim 17, wherein the control message comprises one or more or: a paging message, physical downlink control channel (PDCCH) message, media access control (MAC) control element, or radio resource control (RRC) signaling.

19. An apparatus for wireless communications at a user equipment (UE), comprising:
a processor,
memory in electronic communication with the processor; and
instructions stored in the memory and executable by the processor to cause the apparatus to:
receive a random access configuration message over a wireless channel, the random access configuration message indicating a channel metric and a threshold, wherein the random access configuration message comprises a timing advance;
select a reference signal based at least in part on a received configuration message and based at least in part on at least one of the channel metric or the threshold;
determine the channel metric based at least in part on receiving the random access configuration message, wherein determining the channel metric comprises receiving a measurement of the selected reference signal;
select a first random access procedure from a plurality of random access procedures based at least in part on the channel metric and the threshold indicated in the random access configuration message, wherein selecting the first random access procedure comprises selecting a two-step random access procedure as the first random access procedure based at least in part on the timing advance; and
establish a connection with a network device by performing the first random access procedure.

20. The apparatus of claim 19, wherein the reference signal comprises one or more of: a synchronization signal block (SSB) or channel state information reference signal (CSI-RS), and wherein the channel metric comprises one or more of: a received signal strength indicator (RSSI), reference signal received power (RSRP), reference signal received quality (RSRQ), a signal-to-noise ratio (SNR), or a signal-to-interference-plus-noise ratio (SINR).

21. The apparatus of claim 19, wherein the instructions to select the first random access procedure are executable by the processor to cause the apparatus to:
select between a two-step random access procedure and a four-step random access procedure based at least in part on comparing the channel metric to the threshold;
select the two-step random access procedure if the channel metric satisfies the threshold; and select the four-step random access procedure if the channel metric fails to satisfy the threshold.

22. The apparatus of claim 19, wherein the random access configuration message comprises an indication of the timing advance.

23. The apparatus of claim 19, wherein the instructions are further executable by the processor to cause the apparatus to:
- receive a random access capability received from the network device; and
- determine a cell reselection priority based at least in part on the random access capability,
- wherein the random access capability is received in a master information block (MIB) signal and the cell reselection priority is based at least in part on the random access capability indicating a two-step random access procedure.

24. An apparatus for wireless communications at a user equipment (UE), comprising:
- a processor,
- memory in electronic communication with the processor; and
- instructions stored in the memory and executable by the processor to cause the apparatus to:
  - receive a control message from a network device, the control message specifying for the UE to use a first random access procedure from a plurality of random access procedures to configure a random access message, the plurality of random access procedures comprising a two-step random access procedure and a four-step random access procedure;
  - identify a listen before talk (LBT) procedure based at least in part on the first random access procedure specified in the control message and a procedure for which the first random access procedure is used, the procedure comprising a beam failure recovery, a handover completion, a system information, or a combination thereof;
  - configure the LBT procedure to be performed prior to transmitting the random access message; and
  - establish a connection with the network device by performing the first random access procedure.

25. The apparatus of claim 24, wherein the control message comprises one or more or: comprises a paging message, physical downlink control channel (PDCCH) message, media access control (MAC) control element, or radio resource control (RRC) signaling.

26. The apparatus of claim 24, wherein the LBT procedure is configured based at least in part on a priority associated with the first random access procedure.

* * * * *